US012547466B1

(12) United States Patent
McHenry et al.

(10) Patent No.: US 12,547,466 B1
(45) Date of Patent: Feb. 10, 2026

(54) METHOD AND SYSTEM FOR ADAPTIVE QUANTUM BACKEND SELECTION

(71) Applicant: Qubital LLC, Houston, TX (US)

(72) Inventors: John Reilly McHenry, Sewickley, PA (US); Ethan J. Blumenfeld, Austin, TX (US); Ethan Coyle, Plover, WI (US); Joshua Dominguez, Anthem, AZ (US)

(73) Assignee: Qubital LLC, Houston, TX (US)

( * ) Notice: Subject to any disclaimer, the term of this patent is extended or adjusted under 35 U.S.C. 154(b) by 0 days.

(21) Appl. No.: 19/264,180

(22) Filed: Jul. 9, 2025

(51) Int. Cl.
  *G06F 9/50* (2006.01)
  *G06N 10/70* (2022.01)
  *G06N 10/80* (2022.01)

(52) U.S. Cl.
  CPC ........... *G06F 9/505* (2013.01); *G06N 10/70* (2022.01); *G06N 10/80* (2022.01)

(58) Field of Classification Search
  None
  See application file for complete search history.

(56) References Cited

U.S. PATENT DOCUMENTS

| | | | |
|---|---|---|---|
| 8,886,744 B1 * | 11/2014 | Pabla ................. | G06F 9/505 709/217 |
| 9,794,755 B1 * | 10/2017 | South .................. | H04W 4/021 |
| 10,275,721 B2 | 4/2019 | Dukatz et al. | |
| 10,614,370 B2 | 4/2020 | Johnson et al. | |
| 11,436,519 B1 | 9/2022 | Dridi et al. | |
| 11,514,457 B2 | 11/2022 | Turgman et al. | |
| 11,853,848 B2 | 12/2023 | Johnson et al. | |
| 11,907,092 B2 | 2/2024 | Krneta et al. | |
| 11,972,321 B2 | 4/2024 | Gunnels et al. | |
| 11,983,471 B2 | 5/2024 | Gambetta et al. | |
| 12,105,823 B2 | 10/2024 | Sreedhar et al. | |
| 2019/0188793 A1 | 6/2019 | Molinari et al. | |
| 2019/0310316 A1 | 10/2019 | Jasionowski | |
| 2023/0110628 A1 * | 4/2023 | Heckey ................. | G06F 9/4881 |
| 2023/0289638 A1 | 9/2023 | Peterson et al. | |
| 2025/0130864 A1 * | 4/2025 | Biswas ................. | G06F 9/5083 |
| 2025/0156822 A1 * | 5/2025 | Ward .................. | G06Q 30/0613 |
| 2025/0224991 A1 * | 7/2025 | Knapp .................. | G06F 9/5027 |

* cited by examiner

*Primary Examiner* — Wynuel S Aquino
(74) *Attorney, Agent, or Firm* — Gregory Finch; Finch Paolino, LLC

(57) ABSTRACT

An adaptive orchestration platform routes quantum-computing jobs to optimal backends in real time. A broker service ingests a quantum job description expressed in a provider-agnostic canonical schema, polls status metrics for multiple candidate processors, and derives composite scores using machine-learned, user-weighted factors. The highest-scoring backend is selected, and the job is automatically translated into its native instruction format. Payment is secured by a blockchain escrow smart contract that releases segmented disbursements upon queue confirmation, execution start and verified completion against service-level parameters. Results are hashed to an immutable ledger and failures trigger automated re-routing or refunds.

19 Claims, 17 Drawing Sheets

METHOD AND SYSTEM FOR ADAPTIVE QUANTUM BACKEND SELECTION

FIELD

The present disclosure relates to the field of cloud-enabled quantum computing; in particular, methods and systems for dynamically selecting among heterogeneous quantum processing backends based on real-time performance, cost, and reliability metrics.

BACKGROUND

Quantum-computing services have emerged from multiple cloud providers whose architectures span superconducting qubits, trapped ions, photonics, and quantum annealers. Each vendor exposes proprietary software development kits, command-line tools, and native circuit representations that diverge from community standards such as OpenQASM. Consequently, developers who wish to evaluate a single algorithm on competing hardware must often rebuild or transpile the circuit for every target environment and then re-engineer job-submission codes to satisfy distinct authentication and billing workflows, creating substantial vendor lock-in and slowing adoption of quantum resources.

Even when translation tools are available, choosing an appropriate backend remains a manual, trial-and-error process. Queue lengths fluctuate minute to minute, calibration metrics drift throughout the day, and per-shot pricing differs across providers. Researchers, therefore, rely on incomplete status dashboards or anecdotal experience to predict wait times, execution fidelity and cost, which frequently leads to sub-optimal scheduling, wasted money, and inconclusive experimental results. The lack of a unified, data-driven broker for backend selection limits reproducibility and hampers benchmarking across the quantum-hardware landscape.

Compounding these usability challenges, commercial offerings settle payments independently of workload success or hardware performance. Users pre-purchase credits or pay subscription fees regardless of whether a job completes within advertised service-level windows or achieves the claimed error rates. Disputes over failed runs typically require labor-intensive support tickets because current platforms provide no cryptographically verifiable link between circuit submission, machine execution, outcome accuracy, and financial settlement.

Accordingly, there remains a need for techniques that permit developers to specify a quantum circuit once, receive objective guidance on the most suitable backend in real time, and couple execution with transparent, performance-contingent payment mechanisms. Applicant has developed a solution that is embodied by the present invention, which is described in detail below.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Certain aspects of the present disclosure provide for a computer-implemented method for adaptive quantum backend selection. In accordance with certain aspects of the present disclosure, the computer-implemented method may comprise one or more steps or operations for receiving (e.g., by a broker service executing on one or more processors) a quantum job description expressed in a canonical schema. The computer-implemented method may further comprise one or more steps or operations for identifying a plurality of candidate quantum-computing backends.

The computer-implemented method may further comprise one or more steps or operations for collecting, for each candidate backend in the plurality of candidate quantum-computing backends, status metrics comprising queue length, cost, hardware fidelity, circuit compatibility, and provider reputation. The computer-implemented method may further comprise one or more steps or operations for computing, for each candidate backend in the plurality of candidate quantum-computing backends, a composite score derived from weighted contributions of the status metrics. The computer-implemented method may further comprise one or more steps or operations for selecting, in accordance with a user-specified priority, a target backend having a highest composite score. The computer-implemented method may further comprise one or more steps or operations for translating the quantum job description into a native instruction format of the target backend. The computer-implemented method may further comprise one or more steps or operations for instantiating a smart contract on a blockchain that escrows payment funds contingent upon satisfaction of predetermined service-level parameters. The computer-implemented method may further comprise one or more steps or operations for transmitting the translated instruction format to the target backend for execution. The computer-implemented method may further comprise one or more steps or operations for receiving execution results from the target backend. The computer-implemented method may further comprise one or more steps or operations for verifying that the execution results satisfy the predetermined service-level parameters. Upon successful verification, the computer-implemented method may further comprise one or more steps or operations for releasing the escrowed payment to a backend provider and returning the execution results to the user. Alternatively, upon failed verification, the computer-implemented method may further comprise one or more steps or operations for initiating an automated remediation action.

In accordance with certain embodiments, the computer-implemented method may further comprise one or more steps or operations for dynamically adjusting the weights used in computing the composite score through a machine-learning analysis of historical job outcomes. In certain embodiments, the canonical schema may comprise metadata fields for cost ceilings, fidelity thresholds, and user priorities. In certain embodiments, the computer-implemented method may further comprise one or more steps or operations for writing a cryptographic hash of a quantum circuit contained in the quantum job description and the execution results to an immutable ledger. In certain embodiments, the computer-implemented method may further comprise one or more steps or operations for updating a provider reputation of the target backend based on a success or failure outcome of the execution results. In certain embodiments, the automated remediation action comprises routing the quantum job to a second backend selected according to the composite score and re-executing the job. In certain embodiments, the smart contract releases escrowed funds in milestone tranches that correspond to queue entry, execution start, and successful result verification. In certain embodiments, the user-specified priority comprises at least one of cost minimization, latency minimization, or fidelity maximization. In certain embodiments, the computer-implemented method may further comprise one or more steps or operations for validating a circuit compatibility with hardware constraints of each candidate backend. In certain embodiments, the computer-implemented method may further comprise one or more steps or operations for presenting the user with a forecast of expected queue time and execution cost for each candidate backend.

Further aspects of the present disclosure provide for a system for adaptive quantum backend selection comprising one or more processors and non-transitory memory storing instructions that, when executed, cause the processors to perform one or more operations to receive a quantum job description in a canonical schema via a schema interface module. In certain embodiments, the system may be further configured to monitor a plurality of quantum-computing backends through a provider status monitor to obtain real-time metrics including queue length, cost, and calibration fidelity. In certain embodiments, the system may be further configured to compute composite scores for the plurality of quantum-computing backends using a scoring engine that applies weighted factors responsive to user priorities. In certain embodiments, the system may be further configured to select a target backend with a highest composite score. In certain embodiments, the system may be further configured to translate the quantum job description into a backend-specific instruction format using a translation engine. In certain embodiments, the system may be further configured to create and manage a blockchain-based escrow smart contract via a blockchain escrow module. In certain embodiments, the system may be further configured to verify execution results and update provider reputation using a verification and reputation manager module.

In accordance with certain embodiments, the provider status monitor polls backend provider application-programming interfaces at configurable time intervals. In certain embodiments, the scoring engine implements a gradient-boosted decision-tree model trained on prior execution data. In certain embodiments, the blockchain escrow module is configured to administer segmented escrow disbursements triggered by sequential on-chain events comprising (i) confirmation of job placement in a target backend queue, (ii) commencement of execution by the target backend, and (iii) validation that execution results satisfy predetermined service-level parameters. In certain embodiments, the system may further comprise a user dashboard interface configured to display predicted queue times, costs, and fidelity scores for the plurality of quantum-computing backends.

Still further aspects of the present disclosure provide for a non-transitory computer-readable medium storing instructions that, when executed by one or more processors, cause the processors to perform one or more operations of a method for adaptive quantum backend selection. In accordance with certain embodiments, the one or more operations comprise receiving (e.g., by a broker service executing on one or more processors) a quantum job description expressed in a canonical schema. In accordance with certain embodiments, the one or more operations comprise identifying a plurality of candidate quantum-computing backends. In accordance with certain embodiments, the one or more operations comprise collecting, for each candidate backend in the plurality of candidate quantum-computing backends, status metrics comprising queue length, cost, hardware fidelity, circuit compatibility, and provider reputation. In accordance with certain embodiments, the one or more operations comprise computing, for each candidate backend in the plurality of candidate quantum-computing backends, a composite score derived from weighted contributions of the status metrics. In accordance with certain embodiments, the one or more operations comprise selecting, in accordance with a user-specified priority, a target backend having a highest composite score. In accordance with certain embodiments, the one or more operations comprise translating the quantum job description into a native instruction format of the target backend. In accordance with certain embodiments, the one or more operations comprise instantiating a smart contract on a blockchain that escrows payment funds contingent upon satisfaction of predetermined service-level parameters. In accordance with certain embodiments, the one or more operations comprise transmitting the translated instruction format to the target backend for execution. In accordance with certain embodiments, the one or more operations comprise receiving execution results from the target backend. In accordance with certain embodiments, the one or more operations may comprise verifying that the execution results satisfy the predetermined service-level parameters. In accordance with certain embodiments, upon successful verification, the one or more operations may comprise releasing the escrowed payment to a backend and returning the execution results to the user. Alternatively, upon failed verification, the one or more operations may comprise initiating an automated remediation action.

In accordance with certain embodiments, the one or more operations further comprise implementing a reinforcement learning model to update weights applied to the status metrics based on observed discrepancies between predicted and actual execution outcomes. In certain embodiments, the one or more operations further comprise maintaining an off-chain distributed data store for measurement outcomes and metadata associated with executed quantum jobs. In certain embodiments, the one or more operations further comprise recording audit-trail hashes of each quantum job and corresponding results on the blockchain. In certain embodiments, the one or more operations may further comprise triggering an automatic partial refund through the smart contract when a measured fidelity of the execution results falls below a user-defined threshold.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The systems and methods of the present disclosure may be better understood from the following illustrative description with reference to the following drawings in which.

DETAILED DESCRIPTION

Figure 1:
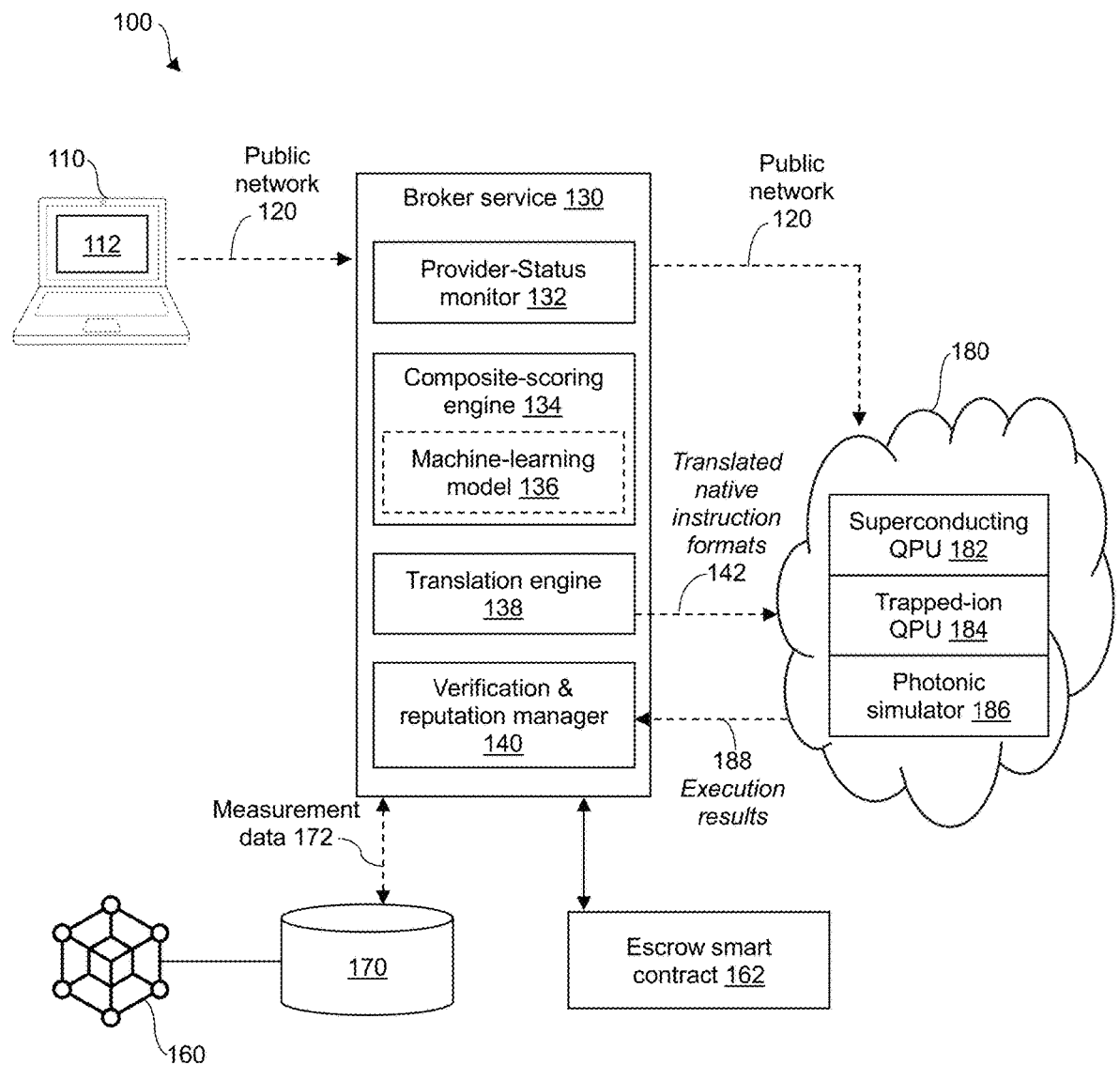
FIG. 1 illustrates an overall system environment in which a broker service intermediates between an end-user workstation and multiple heterogeneous quantum-computing backends reachable through cloud networks.

It should be appreciated that all combinations of the concepts discussed in greater detail below (provided such concepts are not mutually inconsistent) are contemplated as being part of the inventive subject matter disclosed herein. It also should be appreciated that terminology explicitly employed herein that also may appear in any disclosure incorporated by reference should be accorded a meaning most consistent with the particular concepts disclosed herein.

Following below are more detailed descriptions of various concepts related to, and embodiments of, inventive methods, apparatus and systems related to a broker service configured to orchestrate quantum workloads across heterogeneous quantum-computing backends. In accordance with certain aspects of the present disclosure, the broker receives a quantum job description expressed in a canonical schema that unifies circuit data and execution preferences. A provider-status monitor continuously gathers real-time status metrics (e.g., queue length, cost, hardware fidelity, circuit compatibility, and provider reputation) for a plurality of candidate backends. A scoring engine applies user-specified priorities to weight those metrics, feeds them through a machine-learning model such as a gradient-boosted decision tree, and produces a composite score for each candidate. The broker selects the backend with the highest composite score, thereby adapting to dynamic conditions while honoring the user's stated objective, whether that be lowest cost, shortest latency, or highest fidelity. In accordance with certain aspects of the present disclosure, after selection, a translation engine converts the canonical job description into the native instruction format required by the target backend and dispatches the translated circuit for execution. Concurrently, a blockchain escrow smart contract locks payment funds on an immutable ledger and defines service-level parameters that must be satisfied before any disbursement occurs. The contract administers segmented escrow disbursements tied to on-chain events that mark queue entry, execution start and verified completion. In accordance with certain aspects of the present disclosure, a verification and reputation manager validates returned execution results against the service-level parameters, records cryptographic audit hashes on the ledger, and writes raw measurement data to an off-chain distributed store within a hybrid ledger architecture. Upon successful validation, the smart contract releases the appropriate tranche of funds and updates the provider reputation; if validation fails, the broker initiates an automated remediation action such as rerouting the job to an alternate backend or issuing a partial refund.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Before the present invention and specific exemplary embodiments of the invention are described, it is to be understood that this invention is not limited to the particular embodiments described, and as such may vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "interface" refers to any shared boundary across which two or more separate components of a computer system may exchange information. The exchange can be between software, computer hardware, peripheral devices, humans, and combinations thereof.

As used herein, the term "broker service" refers to one or more software components, e.g., executing on local or cloud-based processors, that receive quantum job submissions, evaluate available quantum-computing resources, select a target backend, and orchestrate job execution and payment settlement on behalf of a user.

As used herein, the term "quantum job description" refers to a machine-readable data object that encapsulates at least (i) a representation of a quantum circuit or algorithm and (ii) metadata identifying execution preferences such as cost ceilings, fidelity thresholds, or latency targets.

As used herein, the term "canonical schema" denotes a provider-agnostic data model that expresses quantum job descriptions in a uniform, extensible structure independent of any specific vendor's native instruction format.

As used herein, the term "quantum-computing backend" or "backend" comprises a physical or simulated quantum processor, such as a superconducting qubit device, trapped-ion device, photonic processor, quantum annealer, or high-fidelity simulator, accessible through an application-programming interface (API).

As used herein, the term "status metric(s)" are quantifiable attributes describing a backend's moment-to-moment state, including but not limited to queue length, per-shot cost, calibration-derived hardware fidelity, circuit compatibility flags, and historical provider reputation scores.

As used herein, the term "composite score" means a numerical value produced by aggregating weighted status metrics to predict comparative utility of candidate backends for a given quantum job.

As used herein, the term "user-specified priority" is an input parameter, or set of parameters, that dictates the relative weighting of status metrics (e.g., favoring lowest cost, shortest latency, or highest fidelity) during composite-score calculation.

As used herein, the term "native instruction format" refers to the low-level command or pulse sequence syntax required by a specific backend to execute a quantum circuit, such as OpenQASM 2, QIR, Quil, or proprietary JSON schemas.

As used herein, the term "service-level parameters" (SLPs) are execution conditions, such as maximum queue time, minimum measured fidelity, or error-rate ceilings, that a backend must satisfy to earn full payment under an associated smart contract.

As used herein, the term "provider reputation" refers to a time-varying score derived from historical job outcomes, user feedback, and dispute events, reflecting a backend provider's reliability and performance over time.

As used herein, the term "hardware fidelity" encompasses quantitative measures (e.g., average gate error, readout error, or qubit coherence times) that indicate the intrinsic accuracy of a quantum-computing backend at the time of job scheduling.

As used herein, the term "circuit compatibility" indicates whether a submitted circuit (e.g., after transpilation or translation) conforms to a backend's native gate set, qubit count, connectivity graph, and pulse-level constraints.

As used herein, the term "automated remediation action" refers to any machine-triggered corrective procedure, such as rerouting the job to an alternate backend, partial refund processing, or circuit re-transpilation, invoked without manual operator intervention when service-level parameters are not met.

As used herein, the term "blockchain escrow smart contract" designates self-executing code deployed on a distributed ledger that holds payment funds in conditional escrow and releases or refunds the funds in response to on-chain events tied to job progress and verification.

As used herein, the term "segmented escrow disbursements" refer to staged payments released in discrete tranches (e.g., queue entry, execution start, successful verification) as milestone events encoded in the blockchain escrow smart contract occur.

As used herein, the term "immutable ledger" means a data store, such as (but not limited to) a public or private blockchain, whose consensus rules prevent post-commit alteration of recorded transactions, thereby providing tamper-evident provenance for job submissions and results.

An exemplary system, method, and apparatus according to the principles herein may include an adaptive orchestration platform routes quantum-computing jobs to optimal backends in real time. A broker service ingests a quantum job description expressed in a provider-agnostic canonical schema, polls status metrics for multiple candidate processors, and derives composite scores using machine-learned, user-weighted factors. The highest-scoring backend is selected, and the job is automatically translated into its native instruction format. Payment is secured by a blockchain escrow smart contract that releases segmented disbursements upon queue confirmation, execution start and verified completion against service-level parameters. Results are hashed to an immutable ledger and failures trigger automated re-routing or refunds.

In accordance with an exemplary use case provided by embodiments of the present disclosure, an end user may comprise a pharmaceutical researcher who intends to utilize quantum computing to analyze quantum-mechanical effects of an investigational intervention. In accordance with the exemplary use case, the end user may prepare a variational quantum eigensolver circuit, launch a browser-based dashboard and upload the circuit as a quantum job description formatted in the canonical schema. The end user specifies a priority for high hardware fidelity but caps her per-shot budget at twenty cents and requests a maximum queue wait of five minutes. The broker service immediately polls status metrics for several candidate backends (i.e., an eighteen-qubit superconducting processor, a thirty-two-qubit trapped-ion array, and a high-depth photonic simulator) and feeds those metrics into a machine-learning scoring engine. Because the trapped-ion device reports superior average gate error rates and an acceptable queue length, its composite score eclipses the others. The broker therefore selects the trapped-ion backend, translates the canonical schema into the vendor's native instruction format, and pushes the job to the provider's API.

Simultaneously, the system deploys a blockchain escrow smart contract that locks the projected execution cost in cryptocurrency. The contract defines service-level parameters that mirror the researcher's constraints and segments payment into three tranches: queue confirmation, execution commencement, and fidelity-verified completion. As the job enters the target queue, the first tranche releases automatically. Minutes later the backend begins execution, triggering the second tranche. Upon completion, the verification module cross-checks measurement statistics against the fidelity threshold, hashes the results to an immutable ledger for provenance, and stores the full data set in an off-chain repository. Satisfied that the service-level parameters are met, the smart contract disburses the final tranche. The dashboard then updates the trapped-ion provider's reputation score, displays the execution cost and runtime, and offers the end user a one-click option to rerun the circuit on an alternative processor for comparison.

Certain benefits and advantages of the present disclosure include eliminating vendor lock-in by permitting researchers to submit a single canonical quantum job description that the broker transparently translates into any provider's native instruction format.

Certain benefits and advantages of the present disclosure include cutting average queue wait times and per-shot costs (e.g., as benchmarked at reductions of roughly forty-six percent and twenty-three percent, respectively) through real-time composite scoring and adaptive backend selection.

Certain benefits and advantages of the present disclosure include assuring payment fairness and reducing transactional disputes by escrowing funds in a blockchain smart contract that releases segmented disbursements only when service-level parameters are satisfied.

Certain benefits and advantages of the present disclosure include improving computational accuracy by continuously monitoring hardware fidelity metrics and automatically rerouting jobs to alternate devices when calibration drifts threaten user-defined thresholds.

Certain benefits and advantages of the present disclosure include providing tamper-evident provenance for every circuit and result via immutable on-chain audit hashes combined with off-chain storage of full measurement data.

Certain benefits and advantages of the present disclosure include fostering a competitive marketplace in which provider reputations, updated after each job, incentivize higher reliability and transparent performance reporting.

Certain benefits and advantages of the present disclosure include accelerating scientific discovery by integrating a user dashboard that forecasts queue times, costs, and expected fidelities, thereby enabling rapid what-if analysis before execution.

Certain benefits and advantages of the present disclosure include enabling continuous self-optimization of resource allocation policies as machine-learning models retrain on the discrepancies between predicted and observed outcomes.

Certain benefits and advantages of the present disclosure include lowering operational overhead for developers and IT teams by automating error handling, partial refunds, and job re-execution without manual intervention.

Certain benefits and advantages of the present disclosure include supporting cross-platform benchmarking and reproducibility in quantum research because identical circuits can be executed, verified, and compared across heterogeneous hardware under consistent, ledger-recorded conditions.

Turning now descriptively to the drawings, in which similar reference characters denote similar elements throughout the several views, FIG. 1 portrays a distributed quantum-computing environment 100 that stretches from an end-user workstation 110 to multiple heterogeneous quantum-computing backends inside a provider cloud 180. In accordance with certain aspects of the present disclosure, a public network link 120 bridges these domains so the user interacts with every remote service from a single browser-based dashboard 112. In accordance with certain aspects of the present disclosure, environment 100 establishes the context in which the adaptive backend-selection workflow operates.

In accordance with certain aspects of the present disclosure, workstation 110 hosts the dashboard 112, which allows the user to upload a quantum-job description and set execution priorities such as fidelity, latency, or cost. When the user presses a "submit" interface element, dashboard 112 transmits the job across the network 120 to a broker service 130 that coordinates all downstream activity. Because broker service 130 sits between the user and every quantum provider, broker service 130 shields the user from vendor-specific toolchains and fragmented billing systems.

Inside the broker service 130, a provider-status monitor 132 polls application-programming interfaces exposed by each backend and pulls real-time metrics that include queue length, per-shot cost, hardware fidelity, circuit-compatibility flags, and historical provider-reputation scores. In accordance with certain embodiments, provider-status monitor 132 streams those metrics directly into a composite-scoring engine 134 such that broker service 130 always works with current snapshots of provider health rather than stale dashboards or guesswork.

In accordance with certain aspects of the present disclosure, composite-scoring engine 134 partners with a machine-learning model 136 that weighs every metric according to user-specified priorities. For example, when the user favors fidelity, machine-learning model 136 up-weights hardware-error rates and down-weights latency. In accordance with certain embodiments, composite-scoring engine 134 combines the weighted metrics into a composite score for each candidate backend and ranks the candidates from best to worst in milliseconds, allowing broker service 130 to adapt to fast queue changes or calibration drifts.

After broker service 130 selects the highest-scoring backend, a translation engine 138 converts the canonical quantum-job schema into backend-specific native instruction formats 142. Translation engine 138 also remaps logical qubits to satisfy topology constraints and swaps unsupported gates for equivalent sequences, ensuring the payload executes without manual transpilation. Broker service 130 then sends the translated instruction formats 142 through the network link 120 into the cloud 180, which houses a superconducting QPU 182, a trapped-ion QPU 184, and a photonic simulator 186. In accordance with certain aspects of the present disclosure, superconducting QPU 182 positions transmon qubits on a cryogenic silicon substrate and drives them with room-temperature microwave electronics to provide fixed-degree X, Z, and iSWAP-class gates on a nearest-neighbor lattice, while trapped-ion QPU 184 confines a string of clock-state ions in a linear Paul trap, steers universal single- and two-qubit operations with tightly focused laser beams that deliver all-to-all connectivity and ≥99.7% entangling fidelity, and photonic simulator 186 multiplexes squeezed-light modes through on-chip interferometers to emulate large Gaussian circuits that classical hardware cannot sample efficiently; each backend exposes a calibrated API reporting queue length, gate errors, readout fidelity, and connectivity, enabling provider-status monitor 132 to score heterogeneous hardware under a single canonical schema and letting the broker dispatch workloads agnostic to whether the physical qubits arise from superconducting junctions, trapped atomic spins, or continuous-variable photonic modes.

In accordance with certain aspects of the present disclosure, each backend processes the circuit and returns execution results 188 to broker service 130. A verification-and-reputation manager 140 receives those results, checks them against service-level parameters, computes cryptographic hashes of the circuit and measurements, and writes those hashes to an escrow smart contract 162 anchored in an immutable blockchain ledger 160. When verification-and-reputation manager 140 confirms that the results meet fidelity and latency targets, it instructs the smart contract 162 to release segmented payment tranches that reward the provider for queue entry, execution start, and validated completion.

In accordance with certain aspects of the present disclosure, broker service 130 simultaneously stores full measurement data 172 in an off-chain repository 170 so users can audit every shot without incurring on-chain storage fees. It also updates the provider's reputation score to reflect success or failure, thereby influencing future composite-score calculations and nudging vendors toward reliable performance.

Finally, broker service 130 streams the verified results back to the dashboard 112 over the public network 120, where the researcher can download data, visualize outcomes, or rerun the job on an alternate backend for comparison. By chaining these modules in a single data path (e.g., dashboard 112, broker service 130, translation engine 138, cloud backends 180, verification manager 140, and ledger 160, environment 100 demonstrates how embodiments of the present disclosure eliminate vendor lock-in, enforce performance-contingent payments, and deliver tamper-evident provenance for every quantum computation while remaining agnostic to the physical qubit technology in use.

Figure 2:
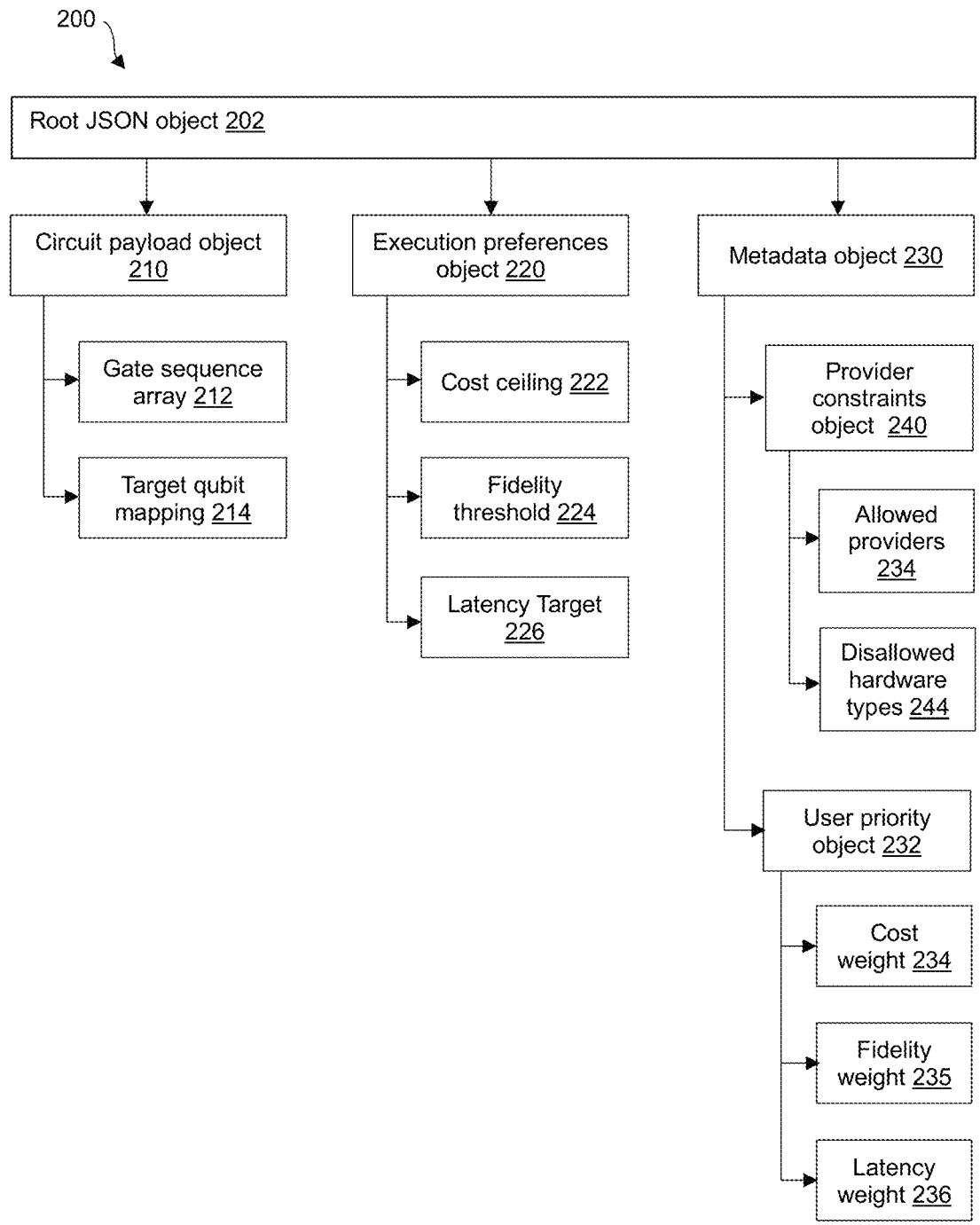
FIG. 2 depicts an exemplary canonical quantum-job schema, in accordance with certain aspects of the present disclosure.

Turning now to FIG. 2, a canonical schema 200 of a system for adaptive quantum backend selection is shown. In accordance with certain aspects of the present disclosure, canonical schema 200 comprises a hierarchical JSON structure anchored by root object 202, which appears at the top of the diagram and serves as the authoritative container for every data field that accompanies a quantum-job submission. In accordance with certain embodiments, root object 202 conveys both the circuit payload and the execution context in a single transportable artifact, ensuring that downstream services consume one uniform description instead of vendor-specific fragments.

In accordance with certain aspects of the present disclosure, root object 202 branches into three first-level child objects: circuit-payload object 210, execution-preferences object 220, and metadata object 230. These child objects align left-to-right so the reader can trace every datum from creation on the user's workstation to validation inside the broker. Their sibling arrangement also underscores that canonical schema 200 stores algorithmic content, quantitative constraints, and descriptive annotations side-by-side without interleaving concerns.

In accordance with certain aspects of the present disclosure, circuit-payload object 210 nests two subordinate elements. Gate-sequence array 212 holds an ordered list of quantum gates already decomposed to the universal set, while target-qubit mapping 214 links each logical qubit index to a symbolic label so the translation engine later resolves that label against physical connectivity graphs. By dividing the circuit content into these parallel structures, canonical schema 200 avoids recomputing qubit indices during every transpilation stage and accelerates backend selection.

In accordance with certain embodiments, execution-preferences object 220 captures quantitative limits that govern job acceptance on any backend. Cost ceiling 222 caps aggregate per-shot pricing, fidelity threshold 224 demands minimum hardware accuracy, and latency target 226 establishes the longest queue wait the user will tolerate. Because broker service 130 (as shown in FIG. 1) evaluates these limits before scoring candidates, the platform discards infeasible backends early and reduces needless API calls.

In accordance with certain embodiments, metadata object 230 subdivides into user-priority object 232 and provider-constraints object 240. In certain embodiments, user-priority object 232 carries weight factors (e.g., cost weight 234, fidelity weight 235, and latency weight 236) that composite-scoring engine 134 (as shown in FIG. 1) multiplies against real-time status metrics retrieved from each backend. In accordance with an exemplary use case, a researcher who prefers accurate results over speed therefore boosts fidelity weight 235 and diminishes latency weight 236 without touching the circuit code.

In accordance with certain aspects of the present disclosure, provider-constraints object 240 protects regulatory or licensing boundaries. Allowed-providers list 242 enumerates vendor identifiers that may handle the payload, whereas disallowed-hardware-types list 244 blocks devices that lack compliance or that introduce export-control complications. The broker consults these arrays before initiating escrow such that the system never funds a job that violates policy.

In accordance with certain aspects of the present disclosure, the arrows in FIG. 2 flows downward from parent to child to emphasize a strict containment hierarchy. The layered design of canonical schema 200 also lets implementers extend the structure by appending new keys at any level without breaking earlier revisions, thereby furnishing backward compatibility demanded by production environments. Collectively, the objects and arrays depicted in FIG. 2 store the circuit, house execution constraints, encode user priorities, and encode provider filters in discrete yet addressable fields. When broker service 130 (as shown in FIG. 1) ingests canonical schema 200, it feeds circuit-payload object 210 to translation engine 138 (as shown in FIG. 1), forwards execution-preferences object 220 to composite-scoring engine 134 (as shown in FIG. 1), and archives metadata object 230 alongside the audit hash, which together deliver a seamless pipeline from user intent to verified quantum computation.

Figure 3:
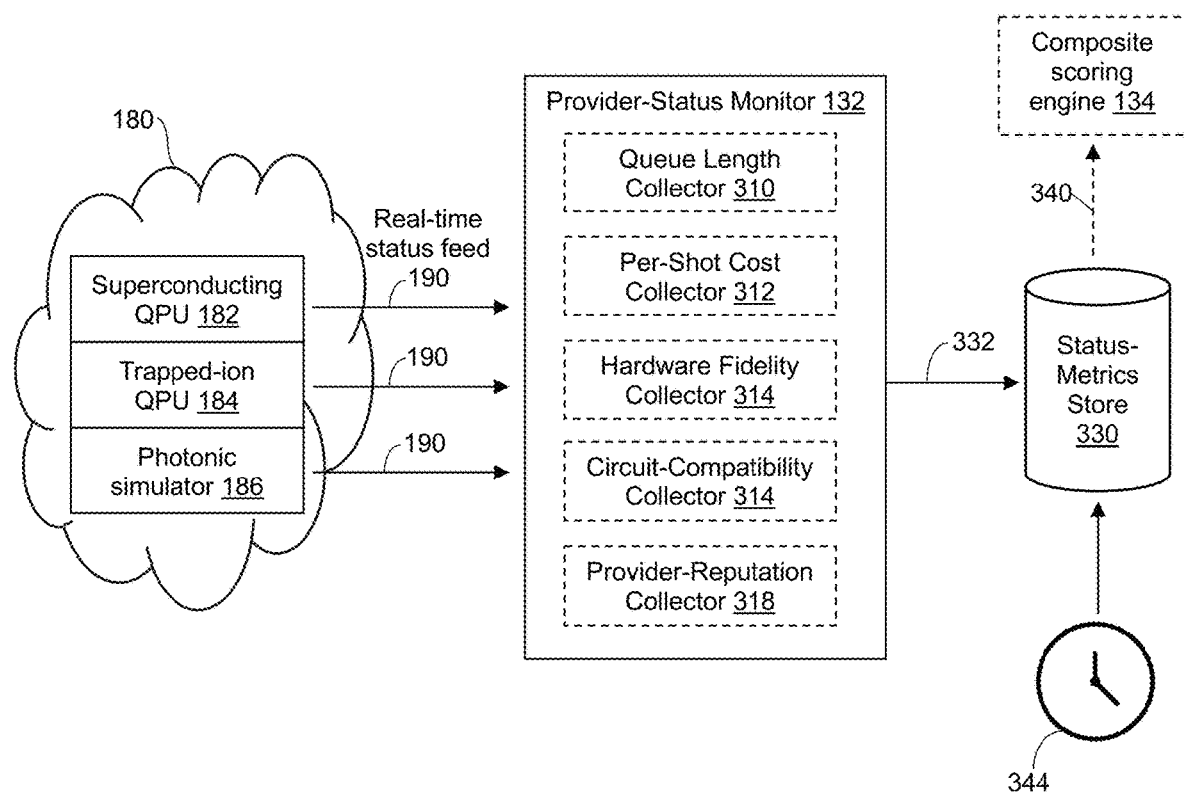
FIG. 3 shows a provider-status monitor that aggregates queue length, per-shot cost, hardware-calibration fidelity, circuit-compatibility flags and provider-reputation scores from a plurality of backends.

Referring now to FIG. 3, an exemplary representation of three representative quantum-computing backends (e.g., superconducting qubit processor 182, a trapped-ion processor 184, and a photonic simulator 186) inside a provider cloud 180 are shown at a left margin of FIG. 3. In accordance with certain aspects of the present disclosure, each backend exposes a real-time status feed 190 that travels horizontally into the broker domain. Arrows carrying identical reference numerals emphasize that every provider, regardless of technology, supplies the same structured telemetry stream so the broker can treat heterogeneous hardware as interchangeable data sources rather than bespoke integrations.

In accordance with certain aspects of the present disclosure, status feeds 190 terminate at provider-status monitor 132, which function as the health-aggregation hub for broker service 130 (as shown in FIG. 1). In accordance with certain embodiments, monitor 132 contains five vertically stacked collector modules arrayed within its rectangular housing. Queue-length collector 310 records the number of jobs awaiting execution on each backend, thereby estimating expected wait time. In certain embodiments, per-shot-cost collector 312 captures dynamic pricing data so the broker can compute projected expenditure before dispatch. Hardware-fidelity collector 314 ingests calibration values such as average single-qubit and two-qubit gate errors, which directly influence the probability that a submitted circuit will achieve chemical-accuracy thresholds. Circuit-compatibility collector 316 analyzes whether the logical gate set and qubit count presented in a candidate job fall inside the physical constraints reported by each device. Provider-reputation collector 318 retrieves long-term performance scores that reflect historical job success, previous dispute outcomes, and any slashing events recorded on-chain.

In accordance with certain aspects of the present disclosure, each collector connects via an individual conduit to status-metrics store 330, depicted as a cylindrical database at the right edge of the monitor. Axial alignment of conduits 332 indicates that every collected metric reaches status-metrics store 330 with identical priority, eliminating single-point bottlenecks and allowing downstream logic to fetch a complete metric vector in one atomic read. In accordance with certain embodiments, status-metrics store 330 anchors a dashed feedback arrow 340 that points upward into composite-scoring engine 134. The dashed styling signals that status-metrics store 330 delivers data on a publisher-subscriber model rather than by blocking procedure calls, thus ensuring that status-metrics store 330 always evaluates the freshest available snapshot without stalling the collectors. By locating composite scoring engine 134 outside provider-status monitor 132, FIG. 3 clarifies that score computation remains logically separate from data acquisition, which simplifies compliance auditing and eases horizontal scaling.

In accordance with certain aspects of the present disclosure, timestamp 344 denotes timestamp metadata that accompanies every stored metric. Front-facing arrows from cloud 180 to provider-status monitor 132 intentionally lack intermediary gateways or firewalls, demonstrating that the provider APIs push data directly into the broker over encrypted channels rather than funneling through third-party dashboards that could introduce latency.

In aggregate, FIG. 3 demonstrates how queue length, cost, fidelity, compatibility, and reputation flow from physical devices 182-186 through provider-status monitor 132 into status-metrics store 330 and onward to scoring engine 134, thereby enabling adaptive backend selection that reacts to live operating conditions while maintaining a historical trail for continuous-improvement pipelines.

Figure 4:
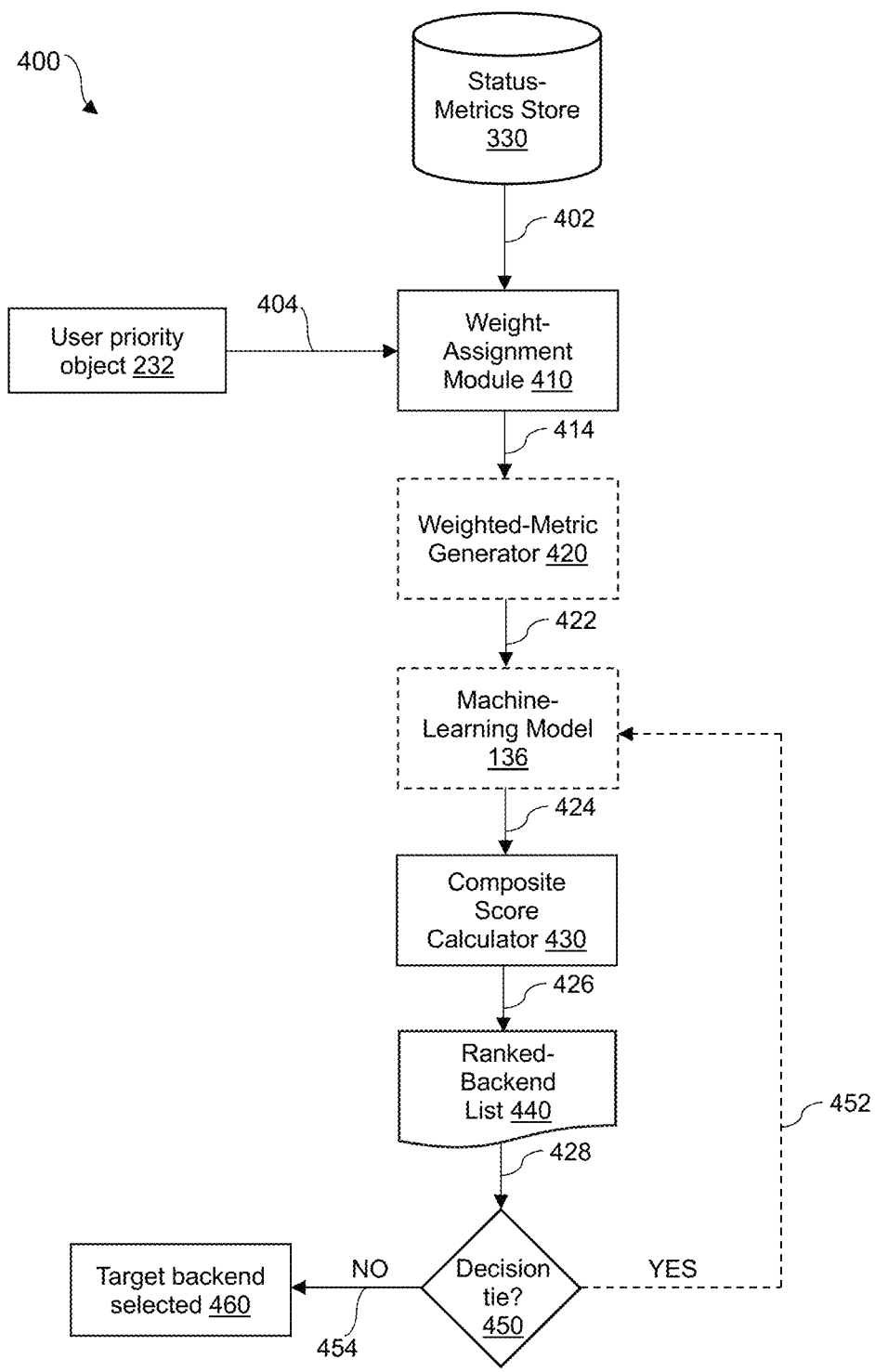
FIG. 4 presents a flowchart of the composite-score calculation in which weighted status metrics feed a machine-learning scoring engine and yield a ranked list of candidate backends.

Turning now to FIG. 4, an internal dataflow 400 of broker service 130 (as shown in FIG. 1) is shown. In accordance with certain aspects of the present disclosure, broker service 130 (as shown in FIG. 1) follows internal dataflow 400 to convert raw telemetry into a ranked list of quantum-computing backends. In accordance with certain embodiments, internal dataflow 400 originates at status-metrics store 330, which houses the queue-time, cost, fidelity, compatibility, and reputation values gathered and persisted in real time by the monitor shown earlier. An arrow 402 indicates that broker service 130 (as shown in FIG. 1) draws its metric vector in an atomic read so every downstream calculation rests on the same temporal snapshot. The operations in internal dataflow 400 may be performed in the order presented, in a different order, or simultaneously. Further, in some exemplary embodiments, some of the operations may be omitted, added, modified, skipped, or the like without departing from the scope of the invention.

In accordance with certain aspects of the present disclosure, weight-assignment module 410 contacts user-priority object 232 through cross arrow 404. In accordance with certain embodiments, user-priority object 232 arrives from the dashboard and carries numerical weights that represent the user's declared bias; for example, a fidelity-first priority sets the fidelity weight near unity while reducing cost and latency weights. Weight-assignment module 410 therefore receives two independent inputs (e.g., fresh metrics on line 402 and preference weights on line 404) and merges them into a weight vector suitable for multiplication.

In accordance with certain embodiments, weighted-metric generator 420 lies directly beneath weight-assignment module 410 and receives a composite arrow 414 that funnels the merged data downward. Weight-metric generator 420 multiplies each status metric by its corresponding user weight in a single vectorized operation so cost, queue length, and fidelity leave the module already scaled in importance. This arrangement removes the need for later conditional branching, which would otherwise complicate real-time execution and invite queue delays.

In accordance with certain embodiments, weight-metric generator 420 forwards its numerically weighted output over arrow 422 into machine-learning model 136. Machine-learning model 136 resides inside a dashed outline to signal that developers may update its parameters without redrawing the figure, thereby accommodating gradient-boosted decision trees, deep-feed-forward networks, or other suitable algorithms. Machine-learning model 136 ingests the weighted feature vector, applies non-linear transformations, and emits a scalar utility estimate that predicts the relative value of each candidate backend under the current operating conditions.

As shown in FIG. 4, arrow 424 carries the utility estimate into composite-score calculator 430, which aggregates the machine-learning output across the full roster of candidates. Composite-score calculator 430 maintains a working array in memory so it can sort the scores in descending order without additional database calls. Upon completion of the sort, arrow 426 feeds the ordered results into ranked-backend list 440. List 440 appears as a document-shaped icon to remind the reader that the broker serializes the list in a standard data interchange format (e.g., typically JSON or protocol buffers) before caching it for audit and latency-sensitive reads.

As shown in FIG. 4, a decision diamond 450 sits beneath the ranked list and examines whether two or more backends share an identical top score. If calculator 430 detects a tie, decision path 452 loops back to machine-learning model 136 so broker service 130 (as shown in FIG. 1) can break the tie by injecting a secondary feature set (for example, real-time temperature drift or incremental calibration age) that only manifests during close contests. If no tie exists, path 454 exits the diamond and arrives at target-backend block 460, which the broker designates as the execution venue and which triggers the downstream translation and escrow routines already described.

By illustrating how status-metrics store 330 merges with user-priority object 232, passes through weight-assignment module 410, scales inside generator 420, transforms within model 136, sorts in calculator 430, and selects the winner via decision diamond 450, FIG. 4 demonstrates that broker service 130 (as shown in FIG. 1) converts heterogeneous telemetry into an actionable ranking in a single streaming operation. As shown in FIG. 4, internal dataflow 400 establishes clear antecedent basis for the composite-score, weighted-metric, and tie-breaking elements of the independent claims while disclosing an implementation that a skilled artisan can replicate without undue experimentation.

Figure 5:
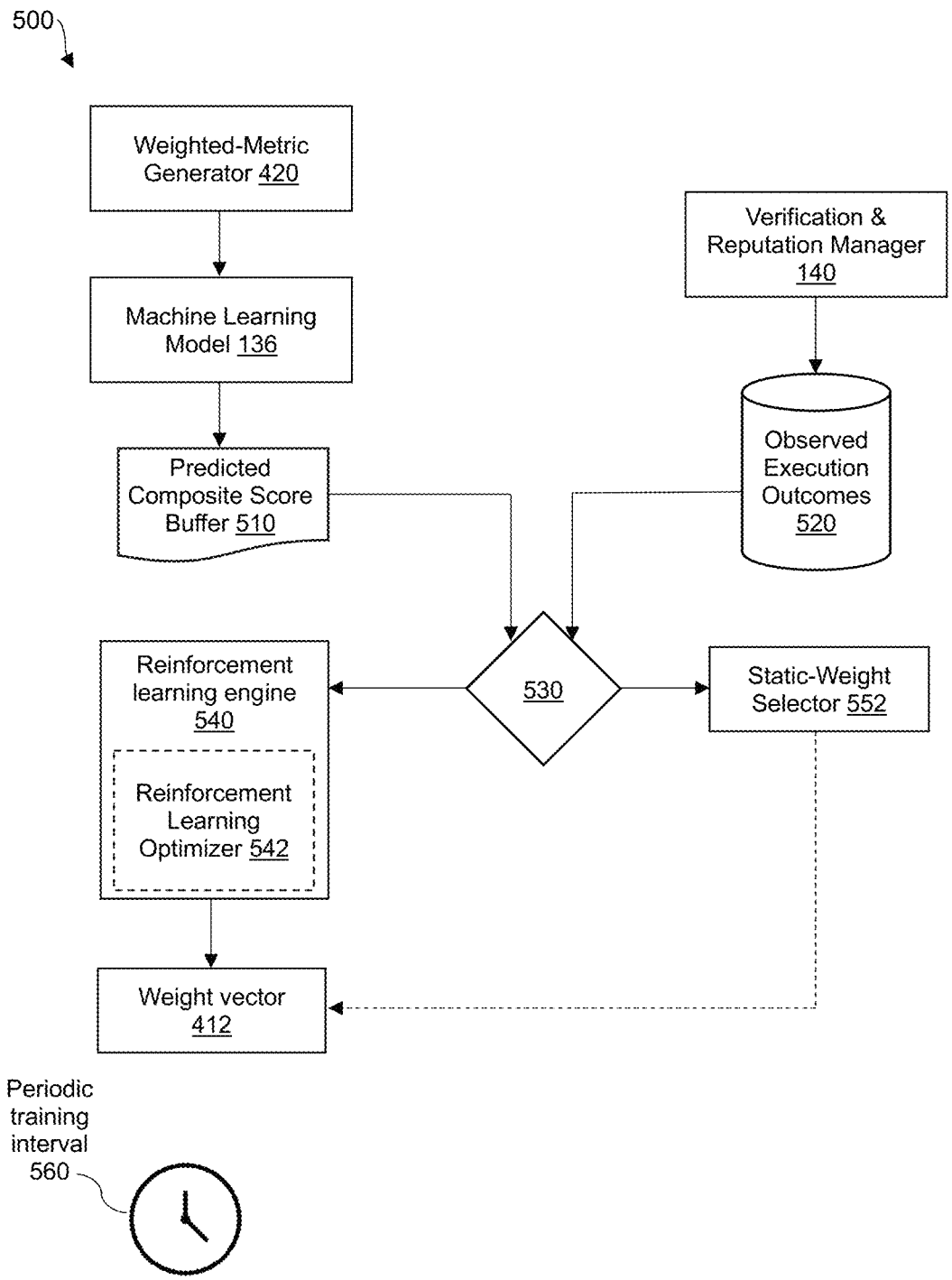
FIG. 5 details an adaptive-weight training loop that refines metric weights through reinforcement-learning feedback derived from discrepancies between predicted and observed execution outcomes.

Referring now to FIG. 5, a process flow 500 illustrates how broker service 130 (as shown in FIG. 1) continuously self-calibrates the weight vector that drives composite-score calculation. In accordance with certain aspects of the present disclosure, process flow 500 begins at weighted-metric generator 420, which multiplies each real-time status metric by the user-priority weights established in the dashboard and delivers the resulting feature vector to machine-learning model 136. Generator 420 occupies the upper left of the sheet, while machine learning model 136 appears immediately to its right inside a dashed border that signals the model's pluggable nature. The operations in process flow 500 may be performed in the order presented, in a different order, or simultaneously. Further, in some exemplary embodiments, some of the operations may be omitted, added, modified, skipped, or the like without departing from the scope of the invention.

In accordance with certain aspects of the present disclosure, machine learning model 136 consumes the weighted vector and produces a predicted composite score for every candidate backend. A solid arrow conveys those predictions into predicted-composite-score buffer 510, depicted as a document icon that temporarily caches the values so the system can compare expectations against reality without race conditions. Buffer 510 thereby decouples inference latency from downstream execution latency.

As each backend finishes a job, verification-and-reputation manager 140 forwards the observed execution outcomes into observed-outcomes store 520. In accordance with certain embodiments, observed-outcomes store 520 records queue time, cost, measured fidelity, and any service-level-parameter violations. By locating observed-outcomes store 520 on the same horizontal plane as predicted composite score buffer 510, FIG. 5 conveys that the system always compares predictions against outcomes captured at identical temporal granularity.

In accordance with certain aspects of the present disclosure, a discrepancy calculator 530, centered between predicted composite score buffer 510 and observed-outcomes store 520, receives both data streams and computes the difference between predicted and observed composite scores. Discrepancy calculator 530 transmits that error signal to reinforcement-learning engine 540. In accordance with certain embodiments, reinforcement-learning engine 540 encloses reinforcement-learning optimizer 542 within a dashed sub-block, indicating that the implementer may substitute alternative optimizers, such as policy-gradient or Q-learning agents, without redrawing the figure.

In accordance with certain aspects of the present disclosure, reinforcement-learning optimizer 542 generates updated weight deltas and pushes them upward along a feedback path into weight vector 412. A clock icon 560 flanks reinforcement-learning engine 540 and denotes a periodic training interval, assuring the reader that the loop iterates on a schedule suitable for non-stationary quantum-hardware conditions.

Beneath the main learning path, static-weight selector 552 connects to weight vector 412. Static-weight selector 552 enables an operator to disable reinforcement learning and inject a fixed weight profile when regulatory, debugging, or deterministic testing requirements arise. The dashed styling of arrow 554 communicates that the static path remains dormant unless invoked by configuration. In accordance with certain aspects of the present disclosure, FIG. 5 demonstrates how broker service 130 refines user-priority weights through reinforcement learning, validates those refinements against verified outcomes, and provides a static fallback path.

Figure 6:
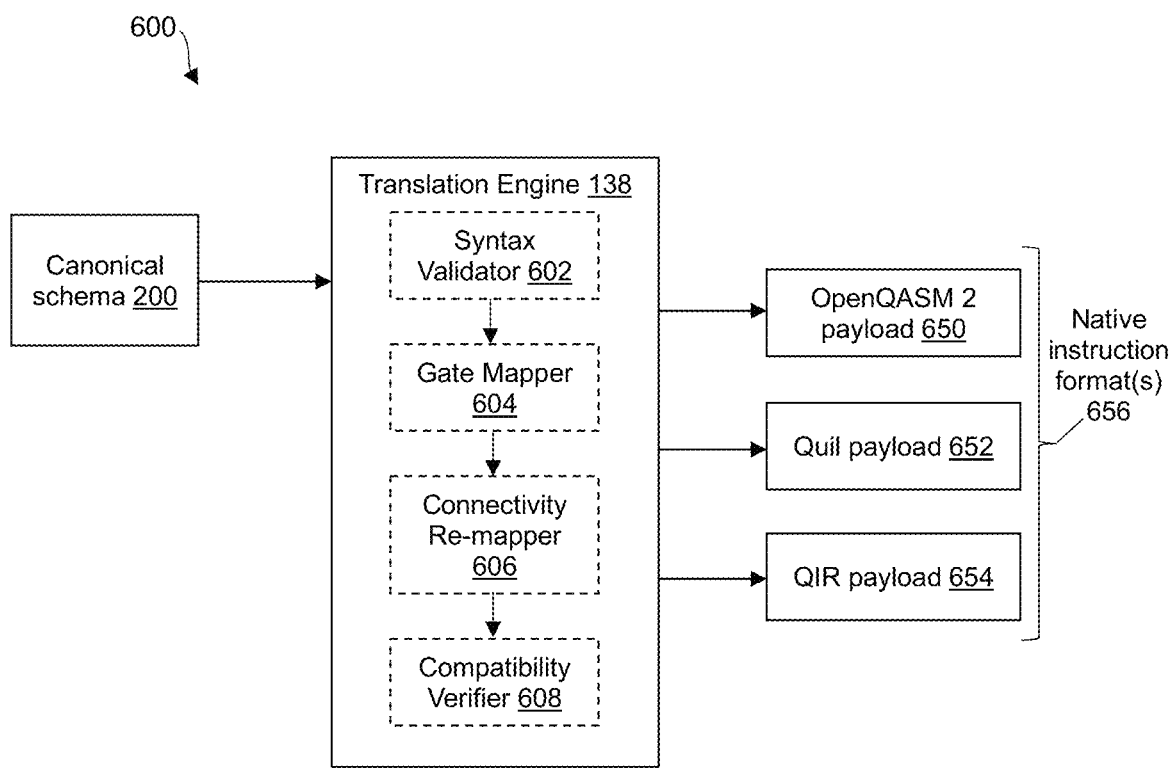
FIG. 6 illustrates a translation engine that converts a canonical job description into a native instruction format (e.g., OpenQASM 2, Quil or QIR) before dispatching the translated payload to a selected backend.

Referring now to FIG. 6, a process flow 600 depicts translation engine 138 situated between canonical schema 200 and a trio of representative native instruction formats 650, 652, and 654. In accordance with certain aspects of the present disclosure, canonical schema 200 is transmitted to translation engine 138 after broker service 130 has identified the target backend. In In accordance with certain aspects of the present disclosure, four sequential processing blocks 602-608 reside inside translation engine 138 and are arranged from top to bottom to mirror the order in which translation engine 138 handles the payload. In accordance with certain embodiments, syntax validator 602 occupies the first position and inspects the incoming schema for required fields, JSON well-formedness, and checksum consistency. If syntax validator 602 discovers a missing or malformed attribute, it raises an exception directly to the broker, so the system avoids wasting queue resources on an ill-specified job.

In accordance with certain embodiments, gate mapper 604 follows syntax validator 602 and converts every universal gate in the circuit-payload object to an equivalent gate or gate sequence supported by the target backend's native set. Mapper 604 performs substitutions such as decomposing a Toffoli gate into controlled-NOT and single-qubit rotations when the backend lacks a direct Toffoli primitive. By showing mapper 604 directly beneath syntax validator 602, FIG. 6 demonstrates that mapping occurs only after the payload proves syntactically correct, thereby preventing cascading errors during later topology analysis.

In accordance with certain embodiments, connectivity re-mapper 606 occupies the third tier and rewires logical-to-physical qubit assignments so the circuit respects the backend's connectivity graph. If the trap-ion device selected by the broker uses an all-to-all topology, connectivity re-mapper 606 may retain the original mapping; if the device enforces nearest-neighbor coupling, the block adjusts qubit indices and inserts SWAP gates to satisfy that constraint. Arrows between gate mapper 604 and re-mapper 606 illustrate that the engine carries forward both the transformed gate list and the original qubit labels, ensuring the reconnect step works with complete context.

In accordance with certain embodiments, compatibility verifier 608 anchors the bottom of the stack and performs a final gate-set and topology compliance check. If compatibility verifier 608 confirms that every gate, qubit index, and pulse parameter lies within hardware limits, the engine releases the converted payload. Should compatibility verifier 608 detect a violation (e.g., such as exceeding the maximum circuit depth), the broker receives an immediate rejection and routes the job to the next-highest-ranked backend without user intervention. Placing compatibility verifier 608 as the terminal block signals a last-chance safeguard before payment escrow initiates.

As shown in FIG. 6, an output of translation engine 138 fans into three diverging branches that terminate at OpenQASM 2 payload 650, Quil payload 652, and QIR payload 654. Bracketing element 656 encompasses OpenQASM 2 payload 650, Quil payload 652, and QIR payload 654 to illustrate that translation engine 138 may output any native format the target backend requires. While OpenQASM 2 payload 650, Quil payload 652, and QIR payload 654 are shown in FIG. 6, additional exemplary native formats are anticipated. Collectively, the linear arrangement of syntax validator 602, gate mapper 604, connectivity re-mapper 606, and compatibility verifier 608 establishes an unambiguous processing pipeline that converts a single canonical schema 200 into at least one backend-specific instruction file 650, 652, 654.

Figure 7:
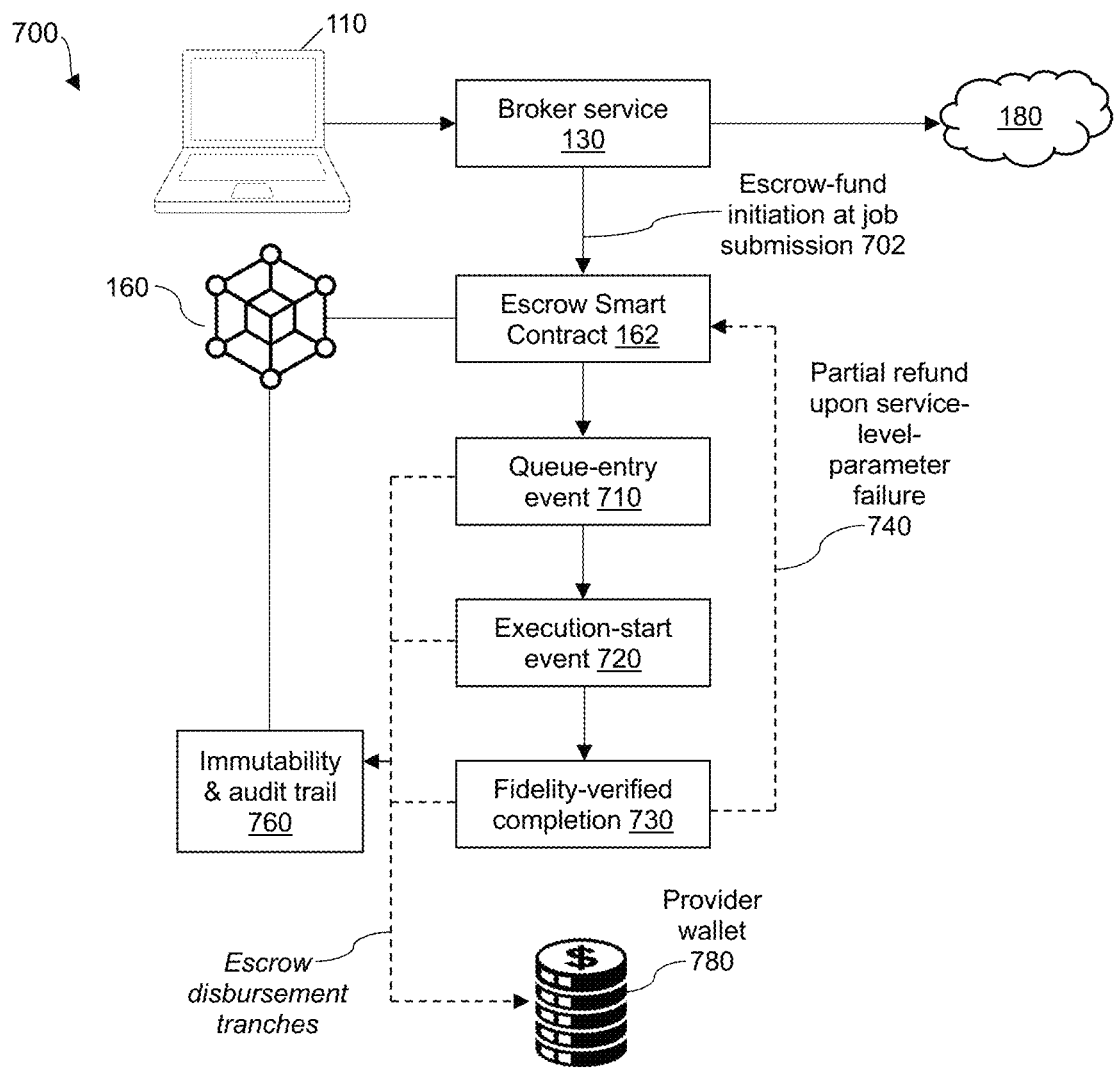
FIG. 7 shows an escrow smart-contract workflow on a permissionless blockchain, highlighting segmented disbursements tied to queue entry, execution start and fidelity-verified completion.

Referring now to FIG. 7, payment-settlement layer 700 that couples every quantum workload to a permissionless ledger is shown. As shown in FIG. 7, broker service 130 is shown at the upper center and provider cloud 180 at the upper right, so the diagram's horizontal axis mirrors the same logical client-to-provider direction as previously introduced. In accordance with certain aspects of the present disclosure, an escrow smart contract 162 proceeds from broker service 130. In accordance with certain embodiments, escrow smart contract 162 is anchored inside blockchain ledger 160. A downward arrow 702 labelled "escrow-fund initiation at job submission" begins at broker service 130 and terminates inside escrow smart contract 162, showing that broker service 130 locks the full execution fee on-chain as soon as it dispatches the translated payload. The operations in payment-settlement layer 700 may be performed in the order presented, in a different order, or simultaneously. Further, in some exemplary embodiments, some of the operations may be omitted, added, modified, skipped, or the like without departing from the scope of the invention.

In accordance with certain aspects of the present disclosure, blockchain ledger 160 outputs three vertically stacked milestones: queue-entry event 710, execution-start event 720, and fidelity-verified completion event 730. In accordance with certain embodiments, escrow smart contract 162 listens first for evidence that the job reached a provider queue at queue-entry event 710. Escrow smart contract 162 proceeds to listen for signals that hardware execution has begun at execution-start event 720. Escrow smart contract 162 proceeds to listen for cryptographic confirmation that returned results satisfy service-level parameters at fidelity-verified completion event 730.

For every milestone arrow that reaches the broker, a corresponding escrow-disbursement arrow of equal thickness, collectively labelled "escrow disbursement tranches" in FIG. 7, travels laterally from escrow smart contract 162 to provider wallet 780. This arrangement demonstrates that escrow smart contract 162 unlocks payment only after the ledger records the linked milestone, thereby enforcing atomic sequencing between on-chain state and off-chain cash flow.

In accordance with certain aspects of the present disclosure, immutability and audit trail 760 attaches to blockchain ledger 160 with a short leader line. Its presence signals immutability and an audit trail, affirming that neither party can later tamper with milestone proofs or payment receipts. Beneath the milestone ladder, payment-settlement layer 700 introduces a partial-refund path 740 that returns funds from contract 162 to broker 130 upon service-level-parameter failure. The dashed styling differentiates this contingency branch from the solid milestone arrows, while the upward orientation of arrow 740 shows that money flows back to the client side rather than toward the provider. By including the refund channel in the same ledger context, FIG. 7 teaches how the invention automates dispute resolution without off-chain tickets.

As shown in FIG. 7, workstation 110 aligns with broker service 130 through a vertical leader to indicate that the user funds the escrow from his or her local dashboard yet remains insulated from contract complexity. On the opposite edge, cloud 180 anchors the provider side of the ecosystem to indicate value transfer from the client domain through the ledger and into the provider's wallet without intervening custodians. By chaining escrow-fund initiation 702, milestone capture 710-720-730, tranche releases to wallet 780, immutability and audit trail 760, and contingency refund 740 in one continuous ledger-centric diagram, FIG. 7 demonstrates how the invention ties quantum-job execution to performance-contingent payment.

Figure 8:
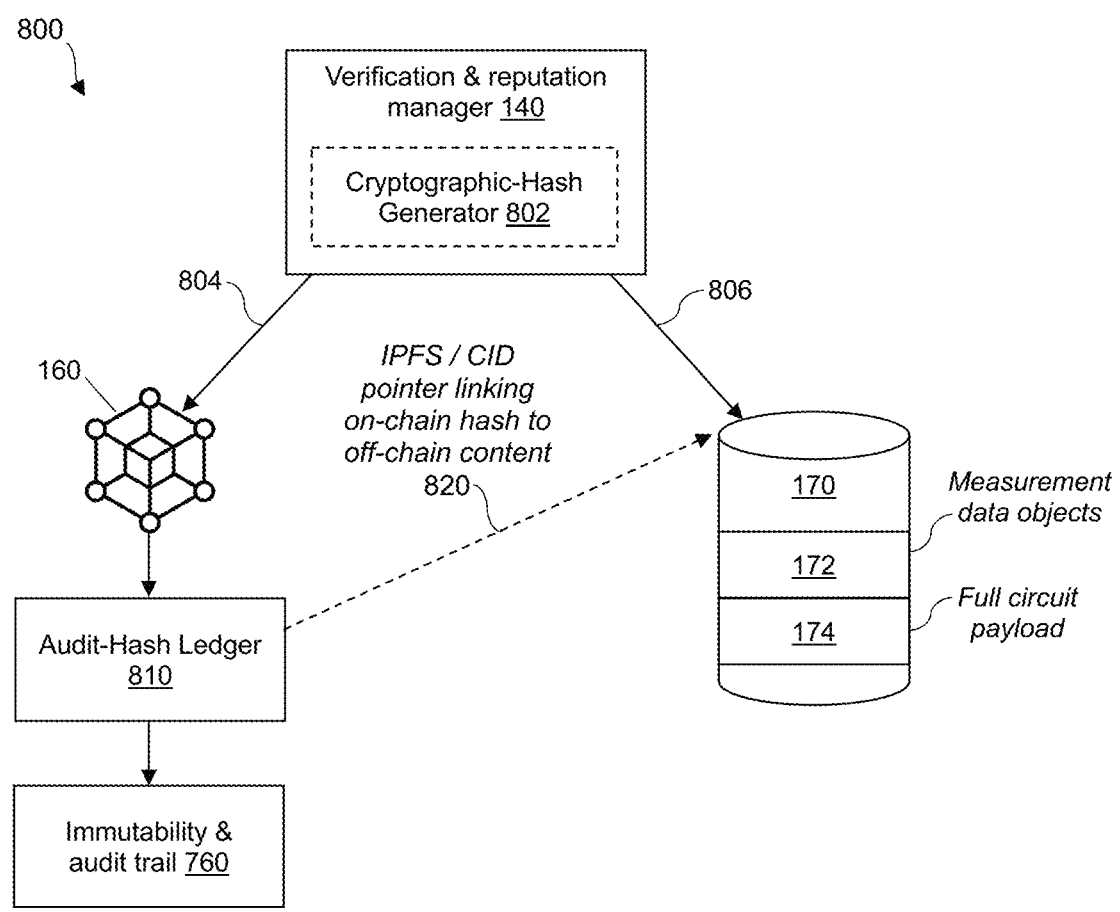
FIG. 8 diagrams a hybrid-ledger architecture in which immutable on-chain audit hashes anchor off-chain storage of raw measurement data in IPFS or a similar distributed file system.

FIG. 8 illustrates a hybrid-ledger architecture 800 that anchors every quantum-job result to an immutable audit trail while diverting bulky artifacts to a lower-cost repository. As shown in FIG. 8, verification-and-reputation manager 140 is centered at the top of the frame to indicate that result validation serves as the authoritative producer of provenance data. Within verification-and-reputation manager 140, a dashed sub-block labelled cryptographic-hash generator 802 generates a fixed-length digest of both the canonical job description and the corresponding measurement payload. Because generator 802 resides inside the validation module rather than in a downstream service, architecture 800 demonstrates that hashing occurs before any third party handles the data, thereby eliminating attack surfaces that could compromise integrity.

As shown in FIG. 8, a solid arrow 804 issues from verification-and-reputation manager 140 and penetrates blockchain ledger 160, terminating in an enlarged block identified as audit-hash record 810. The direct arrow and the enlarged block together signal that blockchain ledger 160 stores only the compact hash rather than the entire measurement set, conserving on-chain space and gas fees. As shown in FIG. 8, immutability and audit trail 760 attaches to audit-hash record 810 with a short leader line, visually conveying that consensus rules render the stored hash tamper-evident. In accordance with certain aspects of the present disclosure, once the contract commits the digest, neither the broker nor the provider can silently rewrite or delete provenance entries.

In accordance with certain embodiments, verification-and-reputation manager 140 emits a second solid arrow 806 that runs horizontally into off-chain repository 170. In accordance with certain embodiments, repository 170 divides internally into measurement-data objects 172 and full circuit payload 174. In accordance with certain embodiments, measurement-data objects 172 and full circuit payload 174 stores raw qubit-by-qubit shot counts separately from the higher-level job description, thereby enabling selective retrieval without forcing auditors to download gigabytes of binary counts when only metadata suffices.

As shown in FIG. 8, a dashed diagonal link 820 spans from audit-hash record 810 to the rim of repository 170 and bears the legend "IPFS/CID pointer." In accordance with certain aspects of the present disclosure, the on-chain record indexes the bulk data through a content-addressable identifier rather than embedding it directly. As shown in FIG. 8, the vertical alignment of verification-and-reputation manager 140, blockchain ledger 160, and repository 170 frames the hybrid ledger as a three-layer stack: computation at the top, immutable proof in the middle, and extensive data at the bottom. In accordance with certain aspects of the present disclosure, architecture 800 begins with validation, anchors integrity on-chain, and then fans out to long-term storage. In accordance with certain embodiments, consumers re-derive hashes and compare them to the ledger, preserving end-to-end trust.

Figure 9:
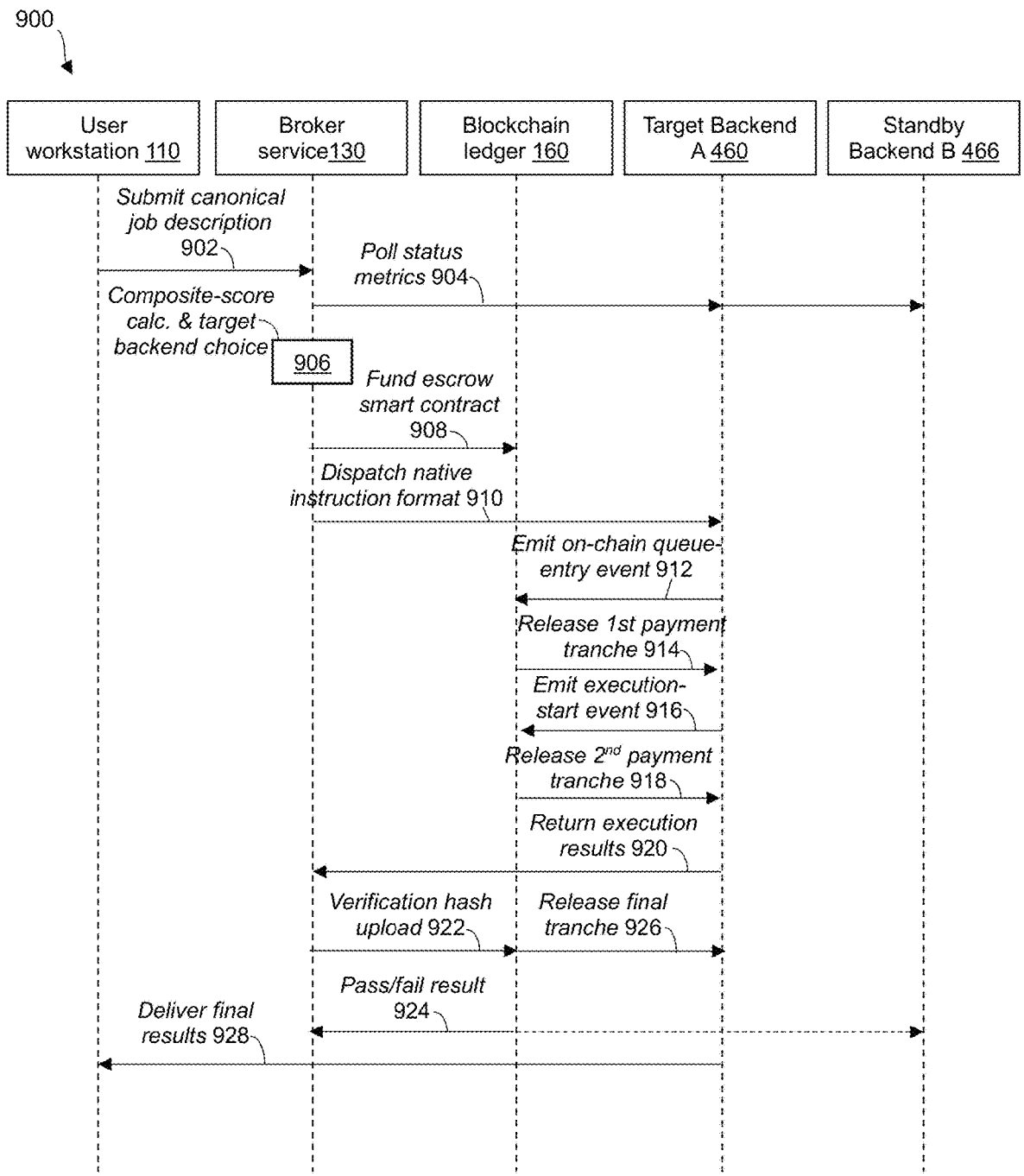
FIG. 9 provides a sequence diagram of a complete adaptive backend-selection cycle that includes automated remediation actions such as rerouting to an alternate backend or issuing partial refunds when verification fails.

Referring now to FIG. 9, an adaptive-backend workflow 900 is shown. In accordance with certain aspects of the present disclosure, FIG. 9 illustrates a vertical-time sequence format demonstrating one complete adaptive-backend workflow from an end user's submission through either verified completion or automated remediation. In accordance with certain embodiments, workflow 900 comprises five lifespans including user workstation 110, broker service 130, blockchain ledger 160, and two candidate execution venues—target backend A 460 and standby backend B 466. In accordance with certain embodiments, the left-to-right ordering in FIG. 9 mirrors the logical progression of control and value from client to provider. The operations in workflow 900 may be performed in the order presented, in a different order, or simultaneously. Further, in some exemplary embodiments, some of the operations may be omitted, added, modified, skipped, or the like without departing from the scope of the invention.

In accordance with certain aspects of the present disclosure, workflow 900 is initiated at action 902 when workstation 110 transmits a canonical job description to broker service 130. Broker service 130 reacts immediately by polling real-time status metrics (arrow 904) and computing composite scores that reveal the most suitable processor under current conditions. In accordance with certain embodiments, arrow 906 records the broker's decision in favor of target backend A 460, thereby signaling that all subsequent orchestration steps will reference that backend unless a later verification failure triggers remediation.

In accordance with certain aspects of the present disclosure, with the target selected, broker service 130 secures payment by calling escrow smart contract 162 on ledger 160 via arrow 908. Broker service 130 deposits the full anticipated execution cost so that every downstream milestone will couple directly to an on-chain release of funds. Immediately afterward, arrow 910 conveys the translated native instruction format to backend A 460, committing the circuit to the provider's inbound queue without exposing the user to vendor-specific APIs.

As shown in FIG. 9, ledger-originated arrows 912 and 916 chronicle the provider's progress. When backend A 460 confirms queue entry, the contract emits event 912, prompting tranche 914 to move irrevocably to the provider's wallet. Once hardware execution starts, event 916 fires and disburses second tranche 918. FIG. 9 therefore proves that each monetary release hinges on an auditable, provider-generated signal rather than a broker assertion, satisfying the escrow-segmentation claim elements.

Upon completion, backend A 460 returns raw measurement data to the broker over arrow 920. In certain embodiments, broker service 130 hashes the circuit-result pair, uploads that digest to ledger 160 (arrow 922), and waits for the contract to report a pass-or-fail verdict 924 against the predefined service-level parameters. By inserting the hash upload before the verdict, FIG. 9 demonstrates that integrity anchoring precedes fund release, ensuring tamper-evident provenance.

In accordance with certain aspects of the present disclosure, when the contract registers a pass, arrow 926 releases the final tranche and arrow 928 delivers verified results back to workstation 110, closing the nominal path. The vertical alignment of 926 above 928 shows that financial settlement finalizes before the user consumes the output, thereby protecting both buyer and seller from race-condition disputes.

In accordance with certain aspects of the present disclosure, FIG. 9 also prepares for adverse outcomes through a dashed contingency path that branches from the pass/fail node 924 toward backend B 466. The dashed styling signals that the broker reroutes the same canonical job, still backed by the original escrow funds, when verification fails or the provider times out. Because backend B stands on an equal footing with backend A, FIG. 9 teaches that remediation involves simply repeating arrows 910 through 928 along the alternate lifeline, while the contract simultaneously issues a partial refund proportional to the failed milestone history.

Figure 10:
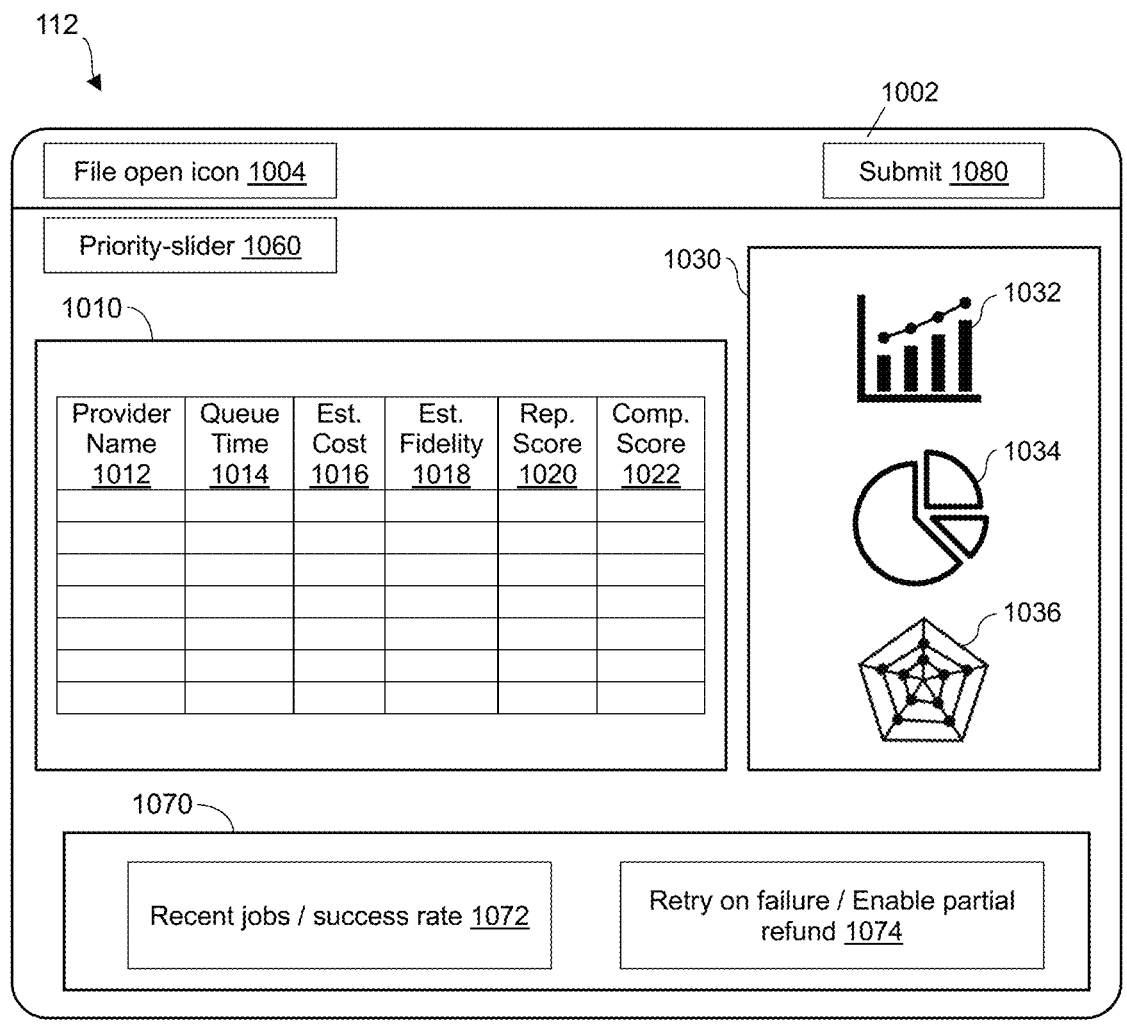
FIG. 10 illustrates a user-dashboard interface that surfaces predicted queue times, costs, fidelity estimates and evolving provider-reputation scores prior to job submission.

Referring now to FIG. 10, a browser-based dashboard interface 112 that guides an end user through every step of a quantum-job submission while surfacing live predictions from the broker is shown. In accordance with certain embodiments, interface 112 comprises a toolbar 1002 that anchors a file-open icon 1004 and a submit button 1080. In accordance with certain embodiments, file-open icon 1004 opens a dialog that injects a canonical-schema object directly into interface 112 and submit button 1080 pushes the fully populated object to the broker only after the user reviews the displayed forecasts and priorities.

In accordance with certain embodiments, beneath the toolbar, interface 112 comprises a horizontal priority slider 1060 that governs the weight assignment described earlier with reference to FIGS. 4 and 5. In certain embodiments, horizontal priority slider 1060 may comprise a graphical interface element that enables a user to increase the fidelity weight used in composite-score calculation (e.g., by shifting it toward the latency end to amplify the queue-time weight). In accordance with certain embodiments, the placement of slider 1060 directly under toolbar 1002 shows that the platform captures user intent before it computes any backend ranking, ensuring a deterministic, single-source-of-truth for priority data.

In accordance with certain embodiments, interface 112 comprises a central data grid 1010 that displays one row per candidate backend. Central data grid 1010 may comprise provider name 1012, queue-time forecast 1014, estimated cost 1016, estimated fidelity 1018, reputation score 1020, and composite score 1022. In accordance with certain embodiments, every cell updates in real time as the provider-status monitor streams fresh telemetry to the browser via the broker's publish-and-subscribe channel, so the grid always reflects current conditions rather than cached snapshots.

In accordance with certain embodiments, interface 112 comprises an analytics panel 1030 that stacks three compact visualizations: a queue-time sparkline 1032, a cost distribution histogram 1034, and a radar chart 1036 that compares fidelity, cost, and reputation on a common scale. By separating numeric forecasts in the grid from graphical trends in the panel, interface 112 satisfies different cognitive styles without obscuring either data set. The arrow-free boundary between panel 1030 and grid 1010 further clarifies that both pull from the same broker feed, not from separate polling loops. In accordance with certain embodiments, interface 112 comprises a status-and-control strip 1070. Status-and-control strip 1070 may comprise a rolling log of recent jobs and their success rates 1072, giving users a quick indicator of historical stability for the selected provider. In certain embodiments, interface 112 comprises two toggle controls, "retry on failure" and "enable partial refund" 1074, which let the user instruct the broker to invoke the remediation and refund logic set out in FIGS. 7 and 9.

Figure 11:
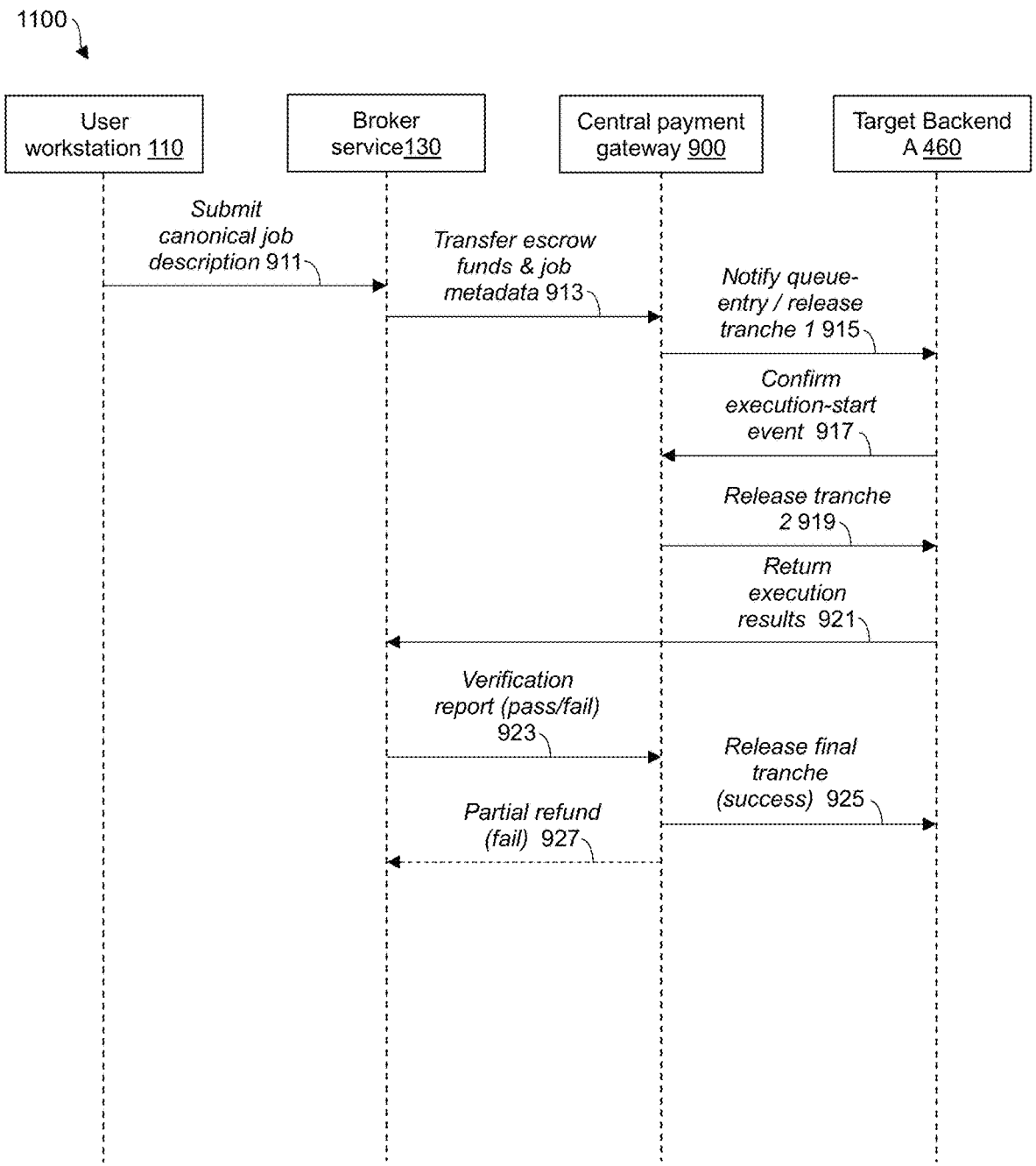
FIG. 11 depicts an alternative escrow implementation that relies on a centralized payment gateway rather than blockchain.

Referring now to FIG. 11, an escrow flow 1100 for the adaptive quantum backend selection system is shown. As shown in FIG. 11, user workstation 110 initiates escrow flow 1100 by submitting the canonical job description along arrow 911 to broker service 130. Immediately thereafter, broker service 130 deposits the full execution fee and associated metadata into escrow wallet 902 inside central payment gateway 900 over transfer path 913, thereby locking funds under the gateway's custodial control before any provider touches the workload. After central payment gateway 900 receives the deposit, escrow flow 1100 may emits a queue-entry notice along arrow 915 to target backend A 460 and simultaneously releases a first disbursement tranche 1 to the provider 915. The horizontal alignment of arrow 915 with tranche 1 shows that payment occurs only after the gateway (i.e., not the broker) confirms that the job has reached an inbound queue. The operations in escrow flow 1100 may be performed in the order presented, in a different order, or simultaneously. Further, in some exemplary embodiments, some of the operations may be omitted, added, modified, skipped, or the like without departing from the scope of the invention.

In accordance with certain aspects of the present disclosure, when backend 460 reports execution-start event 917, central payment gateway 900 triggers a second release arrow 919, moving tranche 2 from escrow wallet 902 into the provider's account. In accordance with certain aspects of the present disclosure, escrow flow 1100 arranges execution-start directly beneath queue-entry to emphasize temporal ordering; i.e., the gateway clears tranche 2 only after it records a block-level receipt that hardware execution has commenced. Because the gateway sits in a regulated domain, the system satisfies jurisdictions that prohibit programmable money on public blockchains while still enforcing milestone-driven settlement.

Upon job completion, target backend A 460 returns raw results to the broker over path 921. Broker 130 verifies those results and forwards a pass-or-fail report 923 back to the gateway. If the broker's report signals success, central payment gateway 900 releases final tranche 3 via arrow 925. Should the verification report indicate failure, dashed refund arrow 927 returns escrowed money to the broker, enabling the automated partial-refund logic as discussed herein.

Figure 12:
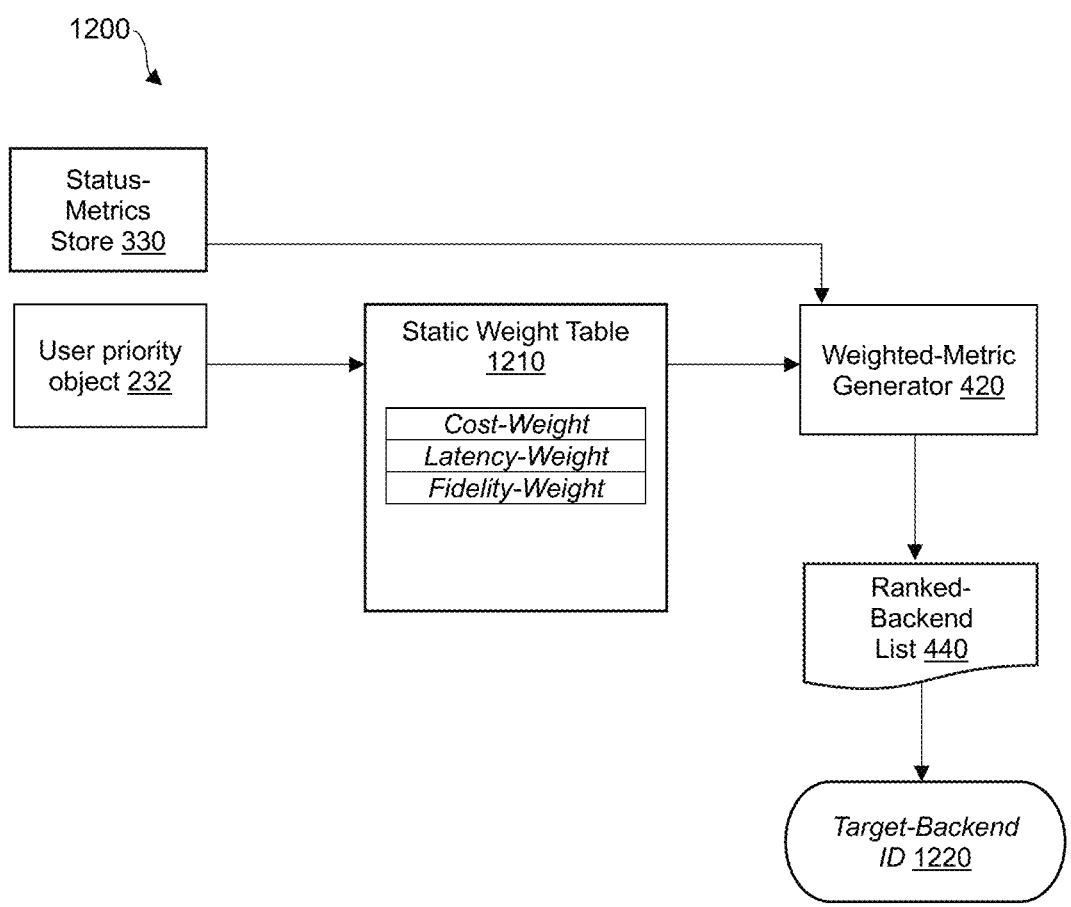
FIG. 12 shows a simplified weighting engine in which user-specified priorities apply fixed weights instead of machine-learned weights.

Referring now to FIG. 12, a simplified weighting engine 1200 that the broker invokes when machine-learned weights are unavailable or when deterministic behavior is required under regulatory or test-validation constraints is shown. In accordance with certain aspects of the present disclosure, the broker calculates composite scores with a fixed table of coefficients rather than with the adaptive learning loop (e.g., previously disclosed for FIGS. 4 and 5).

In accordance with certain aspects of the present disclosure, status-metrics store 330 supplies the same real-time telemetry (e.g., queue length, per-shot cost, and calibration fidelity) that earlier figures stream from the provider-status monitor. A right-facing arrow delivers the metric vector directly to weighted-metric generator 420, thereby preserving the atomic, single-snapshot semantics established throughout the specification. In accordance with certain aspects of the present disclosure, user-priority object 232 carries the user's declared objective (e.g., cost minimization, latency minimization, or fidelity maximization) encoded as a textual or numeric tag. Unlike the adaptive pipeline, the broker does not transform this tag into variable coefficients; instead, it uses the tag as a selector into a static weight table 1210.

In accordance with certain aspects of the present disclosure, static weight table 1210 resides beneath the user-priority object and lists three immutable coefficients: cost weight, latency weight, and fidelity weight. In certain embodiments, each row maps a priority tag to a triplet of predefined numerical values, so the broker always applies a known weighting profile. In accordance with certain aspects of the present disclosure, weighted-metric generator 420 receives two converging inputs: the metric vector from store 330 and the selected coefficient row from table 1210. Weighted-metric generator 420 multiplies each metric by its corresponding static weight in a single pass, producing a weighted feature vector whose dimensionality mirrors the original telemetry. The absence of branching arrows or feedback loops shows that weighted-metric generator 420 completes its work deterministically and without iteration.

In accordance with certain aspects of the present disclosure, weighting engine 1200 carries the weighted vector into ranked-backend list 440. In certain embodiments, a simple sort routine orders the candidate backends from highest to lowest composite score without invoking a machine-learning model. In accordance with certain aspects of the present disclosure, target-backend identifier 1220 emerges from the ranked list and feeds into downstream translation and escrow modules (e.g., as described with reference to FIGS. 6 and 7). By terminating with a single backend ID, weighting engine 1200 demonstrates that even the static-weight pathway ultimately produces the same actionable artefact (e.g., a concrete provider selection) as the adaptive alternative.

Figure 13:
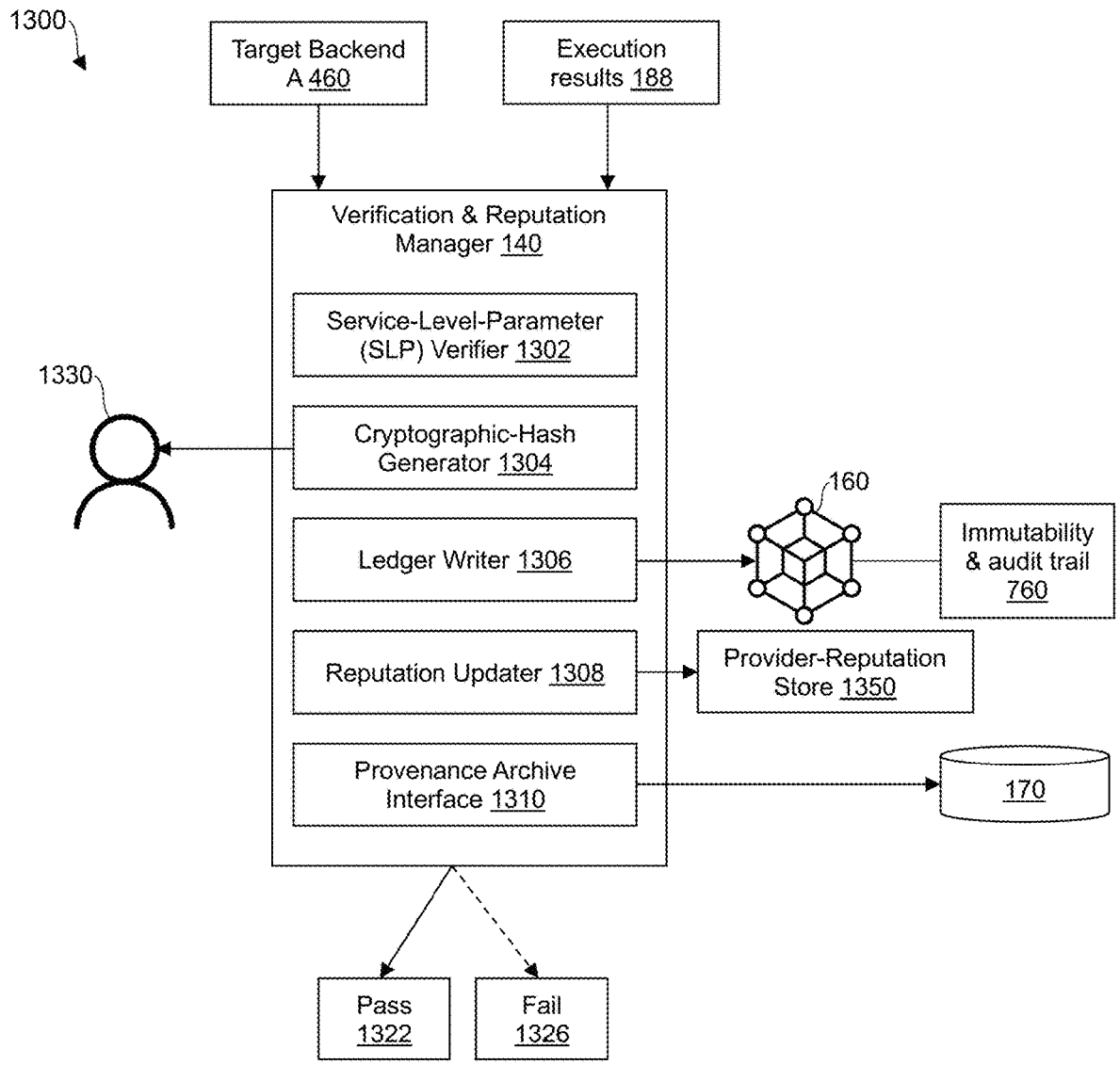
FIG. 13 details a verification-and-reputation manager that hashes circuit inputs and outputs, validates service-level parameters and updates provider reputations accordingly.

Referring now to FIG. 13, a dataflow 1300 that binds every completed quantum job to an immutable record while continuously updating provider trust scores is shown. In accordance with certain aspects of the present disclosure, execution results 188 arrive from a selected backend 460 and enter service-level-parameter (SLP) verifier 1302. In accordance with certain embodiments, SLP verifier 1302 determines whether the run honored every contractual obligation (e.g., queue-time ceiling, cost ceiling, fidelity threshold, and any hardware-specific constraints recorded when the job was dispatched). This gate acts as the sole arbiter of success or failure for both payment and reputation: a "pass" signal 1322 authorizes downstream settlement, whereas a "fail" signal 1326 initiates automated remediation or refund without human intervention unless a manual-override control explicitly supersedes the verdict.

In accordance with certain aspects of the present disclosure, when verifier 1302 issues a pass, cryptographic-hash generator 1304 immediately produces a deterministic digest of (i) the canonical job description, (ii) the full measurement payload, and (iii) the metadata returned by the backend. No data can advance toward financial settlement until cryptographic-hash generator 1304 finishes hashing, thereby ensuring that the system anchors an incorruptible fingerprint of the computation before any value changes hands. In accordance with certain embodiments, ledger writer 1306 receives the digest and submits it to blockchain ledger 160, which stores the digest at immutability and audit trail 760. The coupling between ledger writer 1306 and blockchain ledger 160 guarantees that the verification manager cannot register a job as complete unless the ledger acknowledges the hash.

In parallel with the ledger submission, provenance-archive interface 1310 transfers the raw measurement file and the original circuit description to off-chain repository 170. Provenance-archive interface 1310 writes a content-addressable object, calculated so that the object's cryptographic content identifier (CID) reproduces the same digest just stored on-chain. This dual-location strategy keeps the ledger compact (e.g., only the digest lives on-chain) but still lets auditors retrieve and re-hash the full payload from repository 170 to confirm authenticity.

In accordance with certain aspects of the present disclosure, reputation updater 1308 inspects the pass/fail decision, the ledger confirmation, and any penalty information generated during verification. It increments or decrements the provider's cumulative trust score in reputation store 1350 according to a weighted formula that favors sustained high-fidelity performance and penalizes timeout or fidelity failures. Because updater 1308 executes only after the ledger write succeeds, the provider's reputation becomes a direct, tamper-evident function of immutable job history.

The relationships among these elements form a closed, auditable loop: backend 460 produces raw results; verifier 1302 certifies compliance; generator 1304 seals the evidence into a digest; ledger writer 1306 locks the digest in ledger 160; archive interface 1310 preserves the underlying data in repository 170; and reputation updater 1308 adjusts trust scores in provider-reputation store 1350, which the broker later consumes as part of its composite-scoring process. Each stage depends on the authenticated output of the stage immediately before it, so a defect or attack at any point prevents downstream completion.

Figure 14:
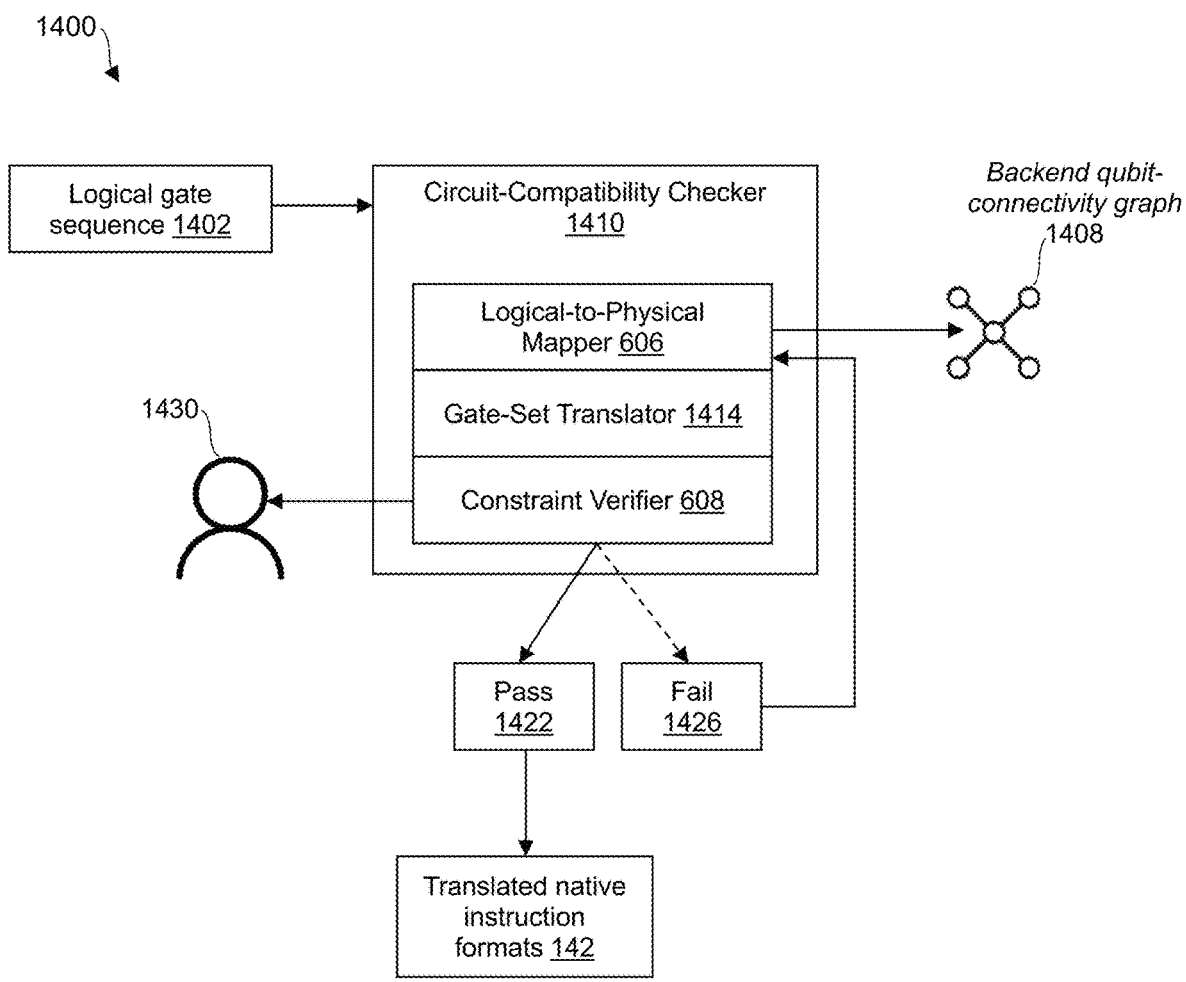
FIG. 14 illustrates a circuit-compatibility checker that maps logical qubits and gate sets onto backend-specific connectivity graphs to confirm executable conformance before dispatch.

Referring now to FIG. 14, a functional block diagram 1400 for the adaptive quantum backend selection system is shown. In accordance with certain aspects of the present disclosure, FIG. 14 addresses the problem of guaranteeing that every quantum circuit delivered by the broker can execute faithfully on the hardware that the adaptive-scoring engine has selected. To accomplish that guarantee, the system instantiates a circuit-compatibility checker 1410 that receives the entire logical gate sequence 1402 immediately after translation engine 138 (as shown in FIG. 1) outputs a candidate native instruction set. In certain embodiments, circuit-compatibility checker 1410 operates as an autonomous pipeline whose sole responsibility is to accept or reject the circuit before escrow funds move and before the provider queues the job.

In accordance with certain aspects of the present disclosure, logical-to-physical mapper 606 forms the entry point of the autonomous pipeline. Logical-to-physical mapper 606 consumes the backend's connectivity graph 1408 together with the circuit's abstract qubit labels and produces an updated qubit allocation that satisfies hardware topology while attempting to minimize swap overhead. Logical-to-physical mapper 606 therefore transforms purely logical indices into concrete device addresses. In accordance with certain aspects of the present disclosure, the mapping is deterministic for any given connectivity graph; i.e., if the broker later chooses a different backend, logical-to-physical mapper 606 recomputes the allocation from scratch rather than reusing a stale mapping.

In accordance with certain aspects of the present disclosure, gate-set translator 1414 accepts the re-labelled circuit emitted by logical-to-physical mapper 606 and rewrites every unsupported logical gate into a sequence of gates drawn from the backend's native instruction repertoire. When a backend lacks a Toffoli primitive, for instance, gate-set translator 1414 decomposes that gate into controlled-NOT operations and single-qubit rotations known to execute natively. In certain embodiments, gate-set translator 1414 combines its rewrite with the qubit allocation supplied by logical-to-physical mapper 606, producing a self-consistent gate list in which both the operations and the qubit addresses agree with hardware capabilities.

In accordance with certain aspects of the present disclosure, constraint verifier 608 receives the fully translated, re-mapped circuit and evaluates it against device-specific limits such as maximum circuit depth, pulse duration ceilings, per-qubit error budgets and calibration freshness. Constraint verifier 608 references the same calibration snapshot that provider-status monitor 132 (as shown in FIG. 1) delivered to the broker's scoring engine, ensuring that the acceptance test reflects the exact hardware conditions used during backend ranking. If the circuit exceeds any limit, constraint verifier 608 immediately categorizes the job as non-conforming.

In accordance with certain aspects of the present disclosure, a non-conforming determination triggers fail loop 1426. The loop directs the same logical circuit back to logical-to-physical mapper 606 but instructs logical-to-physical mapper 606 to use an alternate allocation heuristic or, if available, a different connectivity graph published by the provider. The loop can iterate a bounded number of times to explore several mapping possibilities without unbounded compile time. If all attempts fail, the broker marks the backend incompatible for this job and re-starts composite-score evaluation on the next highest-ranked candidate.

In accordance with certain aspects of the present disclosure, a manual-override control 1430 injects an explicit override token into constraint verifier 608 when an operator authorizes execution despite a constraint violation; for example, during emergency root-cause analysis or during provider-assisted debug sessions. Because the override token enters at the verifier rather than the mapper or translator, the system preserves a complete audit trail showing that the operator, not the automatic pipeline, waived the constraint.

In certain embodiments, when constraint verifier 608 confirms that the circuit satisfies every limit, it emits a pass signal 1422 and releases the circuit for dispatch along path 142. The broker then funds escrow, records the compatibility verdict in the job ledger, and hands the translated instruction list to the provider. The pass signal therefore acts as the gating input for both financial and computational commitment; without it, neither escrow nor execution can begin.

In accordance with certain embodiments, connectivity graph 1408 plays an informational role throughout this workflow. Logical-to-physical mapper 606 consults the graph to route qubit interactions, gate-set translator 1414 references it when choosing composite gate substitutions that minimize error, and constraint verifier 608 uses it to check that every two-qubit operation targets an allowed edge. By relying on a single shared graph object, the three stages eliminate discrepancies that could arise if each stage consulted a distinct hardware description.

In accordance with certain aspects of the present disclosure, the relationships among the elements stand in strict functional order: logical-to-physical mapper 606 modifies qubit indices, gate-set translator 1414 rewrites gate operations, constraint verifier 608 certifies the assembled circuit, fail loop 1426 optionally re-invokes mapping and translation, and pass signal 1422 authorizes downstream escrow and dispatch. No downstream component may consume a circuit until every upstream component signals completion. This ordering prevents an invalid or partially compiled circuit from ever reaching a production backend.

In accordance with certain aspects of the present disclosure, FIG. 14 demonstrates that the broker does not rely on vendor dashboards or ad-hoc transpilation scripts to ensure compatibility. Instead, it applies a formal, repeatable pipeline whose outputs (i.e., pass signal 1422 or fail loop 1426) determine both the financial and computational fate of the job.

Figure 15:
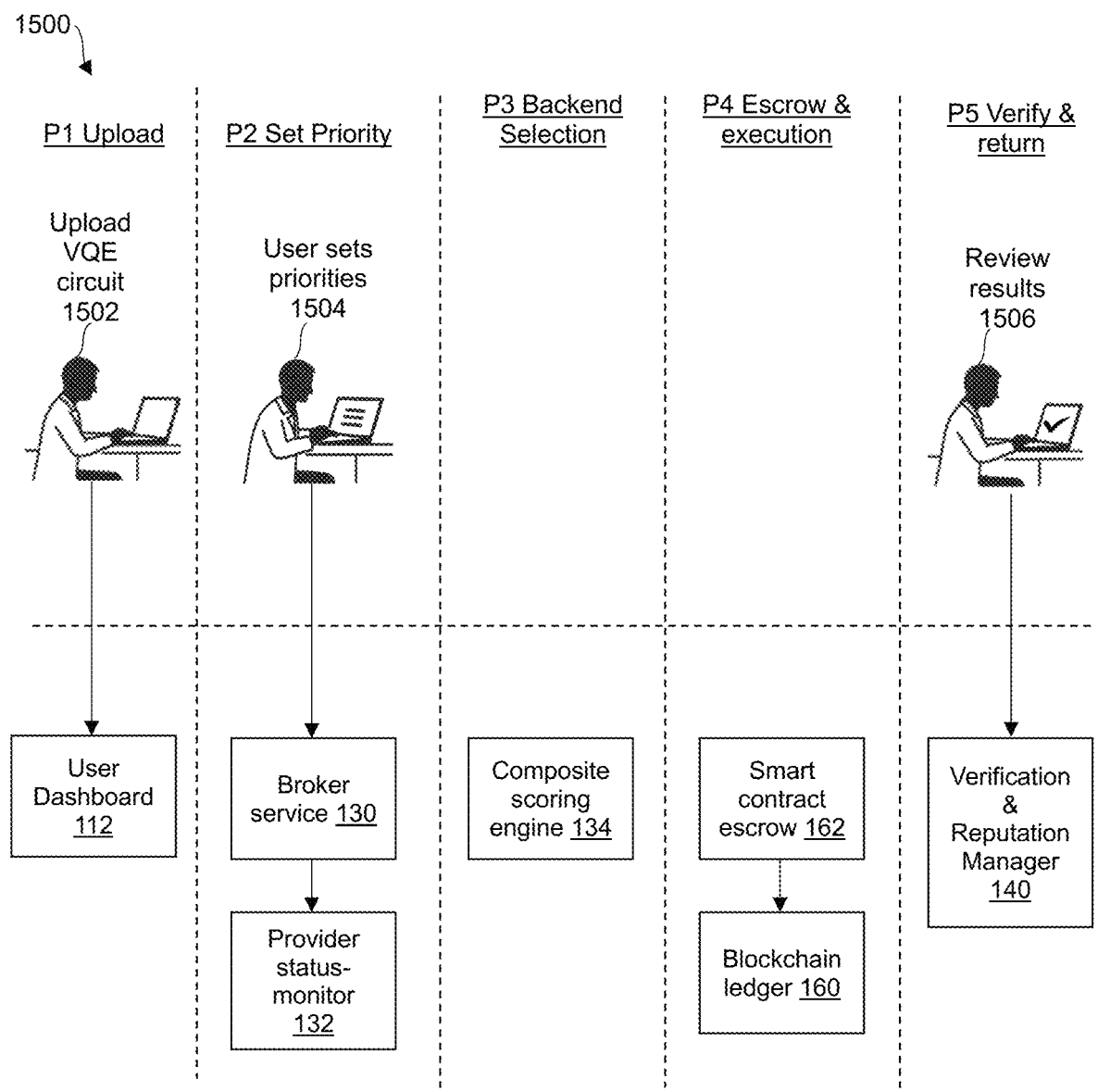
FIG. 15 depicts a process flow diagram of an exemplary use case of the method and system for adaptive quantum backend selection, in accordance with certain aspects of the present disclosure.

FIG. 15 delineates a canonical execution flow 1500 that links the user-facing dashboard, the broker's decision logic, a selected quantum backend, and the distributed-ledger settlement layer into one causally closed sequence. In accordance with certain aspects of the present disclosure, FIG. 15 illustrates an exemplary use case in which a researcher user may select a quantum backend for a quantum computing task. In accordance with certain aspects of the present disclosure, dashboard 112 initiates flow 1500 by accepting both a circuit upload event 1502 and a priority-configuration event 1504. The upload event converts the researcher's file into a canonical schema 200 (e.g., canonical schema 200 as shown in FIG. 2), and the priority event encodes explicit weight factors (e.g., cost, latency, fidelity) into a user-priority object. Because dashboard 112 transmits those two artifacts as a single atomic submission, every downstream component interprets the workload and the user's intent under the same transaction identifier, eliminating race conditions in which telemetry could become misaligned with preference data.

In accordance with certain aspects of the present disclosure, broker service 130 receives the combined submission and invokes provider-status monitor 132 to obtain real-time queue length, pricing, and calibration fidelity for every registered quantum backend. Composite-scoring engine 134 fuses that telemetry with the priority weights contained in the user-priority object (e.g., user-priority object 232 as shown in FIG. 2) and produces a ranked list whose head entry identifies the "target backend" for the present job. The broker therefore binds live hardware state to user intent by deterministic arithmetic rather than by manual selection or static routing rules.

In accordance with certain aspects of the present disclosure, after designating a target backend, the broker passes the canonical job description to translation engine 138, which emits a native instruction payload 142 guaranteed to satisfy the backend's gate set and connectivity constraints as certified by a circuit-compatibility checker. Only after the checker returns a pass signal does the broker fund escrow smart contract 162, thereby coupling circuit admissibility to financial commitment. This dependency ensures that neither funds nor queue slots become locked against an unexecutable circuit.

In accordance with certain aspects of the present disclosure, smart contract 162 escrows the entire predicted execution fee on blockchain ledger 160 and releases payment in milestone tranches only when the backend generates cryptographically attested events (e.g., queue acceptance, execution start, and fidelity-verified completion). Because smart contract 162 derives its release logic from the same service-level parameters embedded in the submission, blockchain ledger 160 enforces exactly the guarantees the user recorded at upload, without discretionary intervention by broker or provider.

In accordance with certain aspects of the present disclosure, the selected quantum processor executes the translated circuit and streams measurement data back to verification-and-reputation manager 140. In certain embodiments, verification-and-reputation manager 140 recalculates the circuit's fidelity and latency in light of the observed results, hashes the payload together with the canonical job description, and writes that digest to blockchain ledger 160 before approving the final milestone. If the manager detects any deviation from contractual thresholds, it withholds approval, instructs the contract to refund the user partially or in full, and triggers composite-scoring engine 134 to reroute the job to the next-best backend (e.g., all without requiring user intervention).

In accordance with certain aspects of the present disclosure, when verification-and-reputation manager 140 registers a pass condition, it instructs smart contract 162 to disburse the final tranche and simultaneously updates the provider's cumulative trust score in reputation store 1350 (shown in FIG. 13). Because this update occurs only after the ledger anchors the job hash, the reputation signal inherits the immutability of the underlying record and thus resists manipulation by either party. Composite-scoring engine 134 subsequently consumes the updated reputation metric when ranking future jobs, closing the feedback loop between historical performance and new workload allocation.

Finally, dashboard 112 retrieves a fidelity-verified result package 1506 that includes the molecular-energy estimate, the on-chain hash reference, and the transaction receipts for each escrow milestone. This single payload proves to the researcher that the computation ran on the promised hardware, within the promised budget, and under the promised fidelity constraint, all while furnishing an immutable audit trail for later peer review.

In one illustrative scenario embodied by FIG. 15, a medicinal chemist seated at workstation 110 investigates a transition-metal catalyst by submitting a variational-quantum-eigensolver (VQE) circuit that models the complex's electronic ground state. During Stage P1, the chemist drags a JSON file that encodes the circuit into dashboard 112, which immediately encapsulates the gate list, target-qubit map, and molecular metadata inside a canonical schema (e.g., canonical schema 200 of FIG. 2) and forwards that payload to broker service 130. Entering Stage P2, the chemist moves priority slider 1060 (as shown in FIG. 10) toward the fidelity extreme, doubles the cost ceiling to twenty cents per shot, and sets a queue-time limit of five minutes; dashboard 112 transmits these parameters as user-priority object 232 (as shown in FIG. 2) along the same secure channel that carried the circuit.

Upon reaching Stage P3, provider-status monitor 132 polls three candidate backends: a sixteen-qubit superconducting device, a thirty-two-qubit trapped-ion array, and a high-depth photonic simulator. Composite-scoring engine 134 multiplies the fidelity-centric weights by live error-rate and queue-length telemetry, ranks the candidates, and selects the trapped-ion array as target backend because its average two-qubit fidelity exceeds 99.7 percent, and its estimated wait time falls within the chemist's limit. At Stage P4 the broker funds escrow smart contract 162 with the projected execution fee, prompting blockchain ledger 160 to log the deposit and a milestone-logic engine to release the queue-entry tranche when the trapped-ion provider acknowledges receipt.

As execution begins, the second tranche flows automatically, and the backend runs the VQE circuit, returning measurement data that represent energy-expectation values for successive ansatz parameters. In certain embodiments, Stage P5 unfolds when verification-and-reputation manager 140 hashes both the circuit and the 1,024-shot data set, records that digest in blockchain ledger 160, and computes that the observed fidelity surpasses the 99-percent threshold stated in service-level parameters. Verification and reputation manager 140 instructs smart contract 162 to release the final tranche and dispatches the verified results to dashboard 112, where the chemist reviews a binding-energy estimate of $-1{,}136.8$ kJ mol$^{-1}$ along with a confidence interval derived from the returned error bars.

Because the chemist receives a fidelity-anchored energy value in under five minutes, together with an immutable audit hash, the workflow depicted across panels P1 through P5 demonstrates how embodiments of the present disclosure accelerate quantum-driven materials discovery while guaranteeing that payment only clears when hardware performance aligns with scientific requirements.

Figure 16:
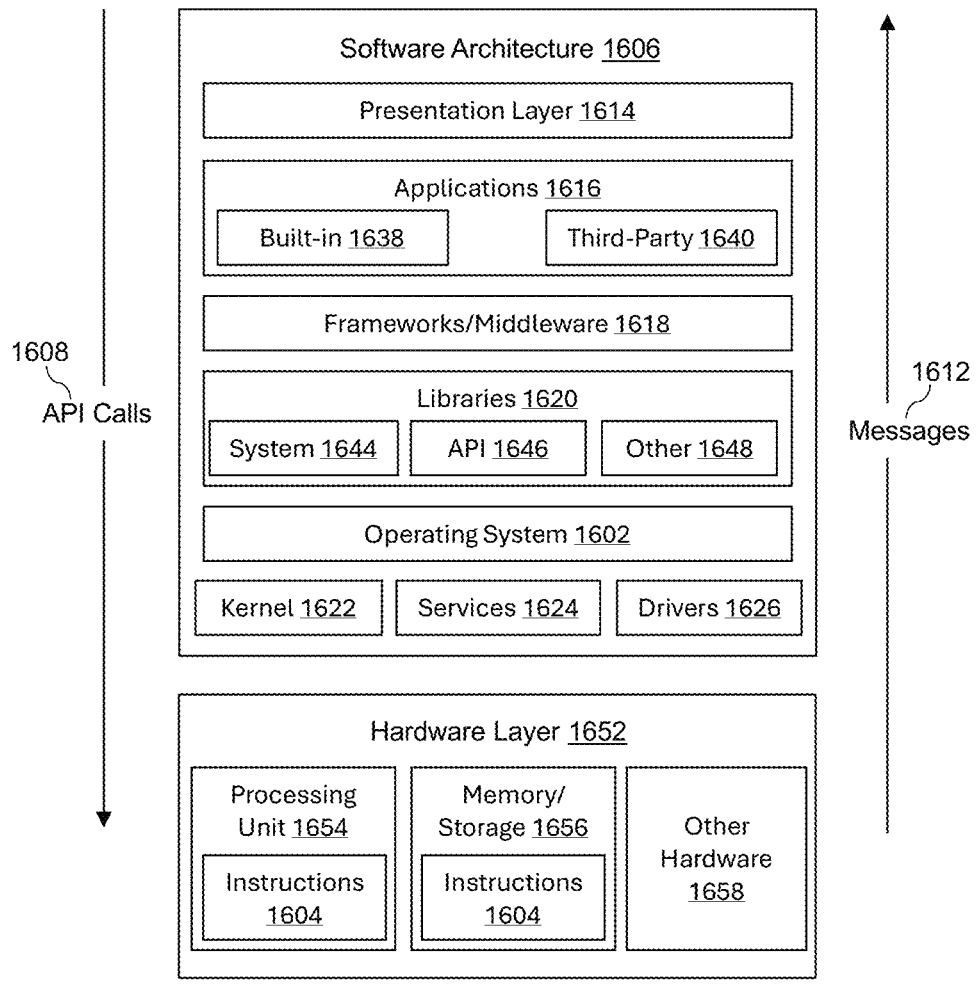
FIG. 16 is a block diagram illustrating a representative software architecture, which may be used in conjunction with various hardware architectures herein described.

FIG. 16 is a block diagram illustrating an exemplary software architecture 1606, which may be used in conjunction with various hardware architectures herein described. FIG. 16 is a non-limiting example of a software architecture, and it will be appreciated that many other architectures may be implemented to facilitate the functionality described herein. The software architecture 1606 may execute on hardware such as machine 1700 of FIG. 17 that includes, among other things, processors 1704, memory 1714, and I/O components 1718. A representative hardware layer 1652 is illustrated and can represent, for example, the machine 1700 of FIG. 17. The representative hardware layer 1652 includes a processing unit 1654 having associated executable instructions 1604. Executable instructions 1604 represent the executable instructions of the software architecture 1606, including implementation of the methods, components and so forth described herein. The hardware layer 1652 also includes memory or storage modules memory/storage 1656, which also have executable instructions 1604. The hardware layer 1652 may also comprise other hardware 1658.

As used herein, the term "component" may refer to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a processor or other programmable processor. Once configured by such software, hardware components become specific machines (or specific components of a machine) uniquely tailored to perform the configured functions and are no longer processors. It will be appreciated that the decision to implement a hardware component mechanically, in dedicated and permanently configured circuitry, or in temporarily configured circuitry (e.g., configured by software) may be driven by cost and time considerations.

A processor may be, or in include, any circuit, circuitry, or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously. The processor as used herein may be a hardware component, which is in at least one of the devices, systems, servers and the like. The processor may include multiple cores and may be spread across multiple devices. The processor includes circuitry to execute instructions relating to the methods and structures described herein for determining relationships and outputting relationship data that is used by various device and their users.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a processor configured by software to become a special-purpose processor, the processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 16, the software architecture 1606 may be conceptualized as a stack of layers where each layer provides particular functionality. For example, the software architecture 1606 may include layers such as an operating system 1602, libraries 1620, applications 1616 and a presentation layer 1614. Operationally, the applications 1616 or other components within the layers may invoke application programming interface (API) API calls 1608 through the software stack and receive messages 1612 in response to the API calls 1608. The layers illustrated are representative in nature and not all software architectures have all layers. For example, some mobile or special purpose operating systems may not provide a frameworks/middleware 1618, while others may provide such a layer. Other software architectures may include additional or different layers.

The operating system 1602 may manage hardware resources and provide common services. The operating system 1602 may include, for example, a kernel 1622, services 1624 and drivers 1626. The kernel 1622 may act as an abstraction layer between the hardware and the other software layers. For example, the kernel 1622 may be responsible for memory management, processor management (e.g., scheduling), component management, networking, security settings, and so on. The services 1624 may provide other common services for the other software layers. The drivers 1626 are responsible for controlling or interfacing with the underlying hardware. For instance, the drivers 1626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1620 provide a common infrastructure that is used by the applications 1616 or other components or layers. The libraries 1620 provide functionality that allows other software components to perform tasks in an easier fashion than to interface directly with the underlying operating system 1602 functionality (e.g., kernel 1622, services 1624 or drivers 1626). The libraries 1620 may include system libraries 1644 (e.g., C standard library) that may provide functions such as memory allocation functions, string manipulation functions, mathematical functions, and the like. In addition, the libraries 1620 may include API libraries 1646 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1620 may also include a wide variety of other libraries 1648 to provide many other APIs to the applications 1616 and other software components/modules.

The frameworks/middleware 1618 (also sometimes referred to as middleware) provide a higher-level common infrastructure that may be used by the applications 1616 or other software components/modules. For example, the frameworks/middleware 1618 may provide various graphic user interface (GUI) functions, high-level resource management, high-level location services, and so forth. The frameworks/middleware 1618 may provide a broad spectrum of other APIs that may be utilized by the applications 1616 or other software components/modules, some of which may be specific to a particular operating system 1602 or platform.

The applications 1616 include built-in applications 1638 or third-party applications 1640. The third-party applications 1640 may invoke the API calls 1608 provided by the operating system 1602 to facilitate functionality described herein.

The applications 1616 may use built in operating system functions (e.g., kernel 1622, services 1624 or drivers 1626), libraries 1620, and frameworks/middleware 1618 to create user interfaces to interact with users of the system. Alternatively, or additionally, in some systems interactions with a user may occur through a presentation layer, such as presentation layer 1614. In these systems, the application/component "logic" can be separated from the aspects of the application/component that interact with a user.

Figure 17:
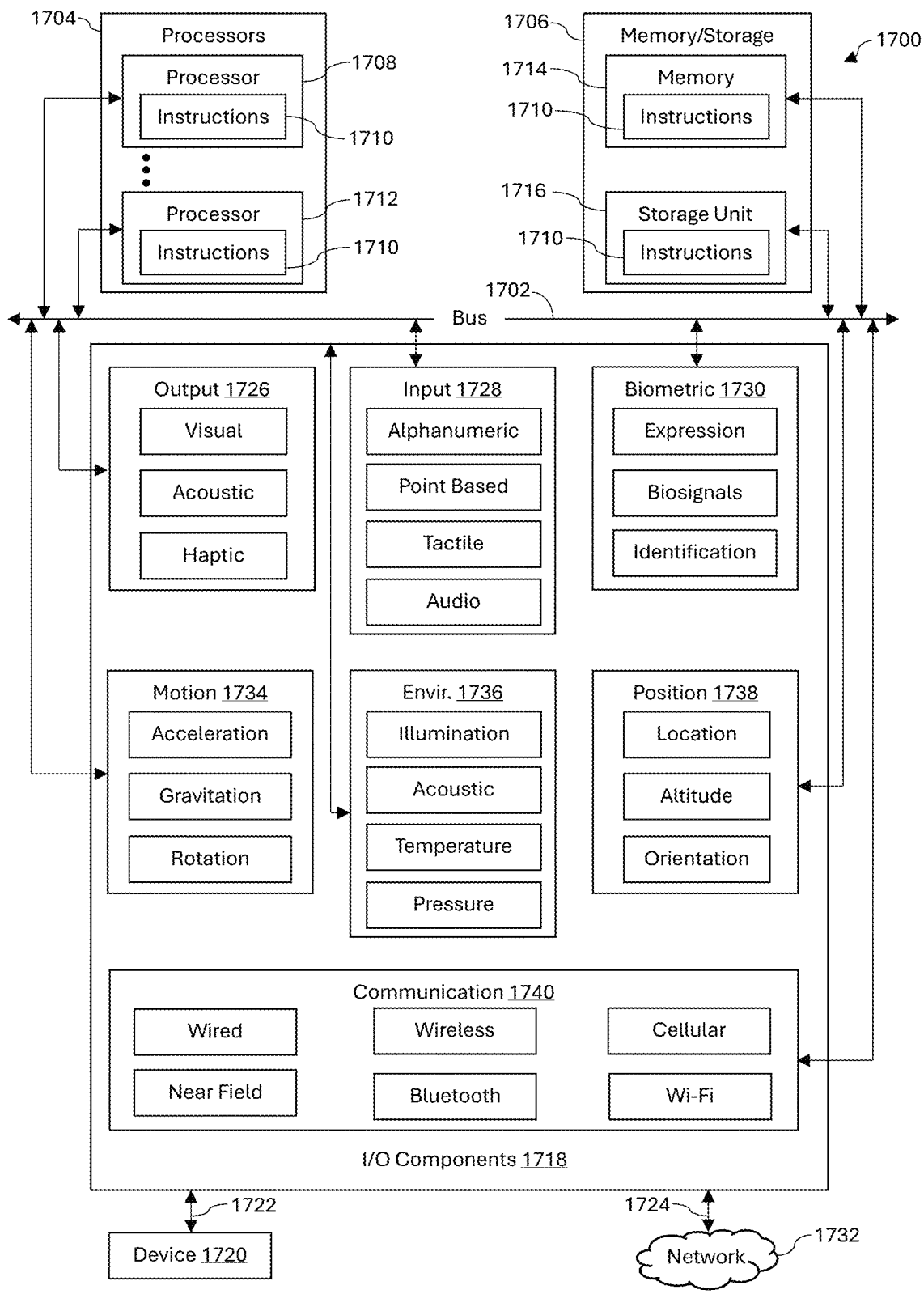
FIG. 17 is a block diagram illustrating components of a machine, according to some exemplary embodiments, able to read instructions from a machine-readable medium (e.g., a machine-readable storage medium) and perform any one or more of the methodologies discussed herein.

FIG. 17 is a block diagram illustrating components (also referred to herein as "modules") of a machine 1700, according to some exemplary embodiments, able to read instructions from a machine-readable medium (e.g., a machine-readable storage medium) and perform any one or more of the methodologies discussed herein. Specifically, FIG. 17 shows a diagrammatic representation of the machine 1700 in the example form of a computer system, within which instructions 1710 (e.g., software, a program, an application, an applet, an app, or other executable code) for causing the machine 1700 to perform any one or more of the methodologies discussed herein may be executed. As such, the instructions 1710 may be used to implement modules or components described herein. The instructions 1710 transform the non-programmed machine 1700 into a particular machine 1700 programmed to carry out the described and illustrated functions in the manner described. In alternative embodiments, the machine 1700 operates as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a laptop computer, a network router, a network switch, a network bridge, or any machine capable of executing the instructions 1710, sequentially or otherwise, that specify actions to be taken by machine 1700. Further, while only a single machine 1700 is illustrated, the term "machine" shall also be taken to include a collection of machines that individually or jointly execute the instructions 1710 to perform any one or more of the methodologies discussed herein.

The machine 1700 may include processors 1704, memory memory/storage 1706, and I/O components 1718, which may be configured to communicate with each other such as via a bus 1702. The memory/storage 1706 may include a memory 1714, such as a main memory, or other memory storage, and a storage unit 1716, both accessible to the processors 1704 such as via the bus 1702. The storage unit 1716 and memory 1714 store the instructions 1710 embodying any one or more of the methodologies or functions described herein. The instructions 1710 may also reside, completely or partially, within the memory 1714, within the storage unit 1716, within at least one of the processors 1704 (e.g., within the processor's cache memory), or any suitable combination thereof, during execution thereof by the machine 1700. Accordingly, the memory 1714, the storage unit 1716, and the memory of processors 1704 are examples of machine-readable media.

As used herein, the term "machine-readable medium," "computer-readable medium," or the like may refer to any component, device or other tangible media able to store instructions and data temporarily or permanently. Examples of such media may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 1718 may include a wide variety of components to provide a user interface for receiving input, providing output, producing output, transmitting information, exchanging information, capturing measurements, and so on. The specific I/O components 1718 that are included in the user interface of a particular machine 1700 will depend on the type of machine. It will be appreciated that the I/O components 1718 may include many other components that are not shown in FIG. 17. The I/O components 1718 are grouped according to functionality merely for simplifying the following discussion and the grouping is in no way limiting. In various exemplary embodiments, the I/O components 1718 may include output components 1726 and input components 1728. The output components 1726 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like. The input components 1728 may also include one or more image-capturing devices, such as a digital camera for generating digital images or video.

In further exemplary embodiments, the I/O components 1718 may include biometric components 1730, motion components 1734, environmental environment components 1736, or position components 1738, as well as a wide array of other components. One or more of such components (or portions thereof) may collectively be referred to herein as a "sensor component" or "sensor" for collecting various data related to the machine 1700, the environment of the machine 1700, a user of the machine 1700, or a combinations thereof.

Communication may be implemented using a wide variety of technologies. The I/O components 1718 may include communication components 1740 operable to couple the machine 1700 to a network 1732 or devices 1720 via coupling 1722 and coupling 1724 respectively. For example, the communication components 1740 may include a network interface component or other suitable device to interface with the network 1732. In further examples, communication components 1740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1720 may be another machine or any of a wide variety of peripheral devices (e.g., a peripheral device coupled via a Universal Serial Bus (USB)). Moreover, the communication components 1740 may detect identifiers or include components operable to detect identifiers.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general-purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

Any publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While certain exemplary embodiments have been described and shown in the accompanying drawings, it is to be understood that such embodiments are merely illustrative of, and not restrictive on, the broad invention, and that this invention is not limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer-implemented method for adaptive quantum backend selection, comprising:
   receiving, by a broker service executing on one or more processors, a quantum job description expressed in a canonical schema;
   identifying a plurality of candidate quantum-computing backends;
   collecting, for each candidate backend in the plurality of candidate quantum-computing backends, status metrics comprising queue length, cost, hardware fidelity, circuit compatibility, and provider reputation;

computing, for each candidate backend in the plurality of candidate quantum-computing backends, a composite score derived from weighted contributions of the collected status metrics;

selecting, in accordance with a user-specified priority, a target backend having a highest composite score based on the computed composite score;

translating the received quantum job description into a native instruction format of the selected target backend;

instantiating a smart contract on a blockchain that escrows payment funds contingent upon satisfaction of predetermined service-level parameters;

transmitting the translated native instruction format to the target backend for execution;

receiving execution results of the translated native instruction format from the selected target backend; and administering segmented escrow disbursements triggered by sequential on-chain events comprising (i) confirmation of job placement in a target backend queue, (ii) commencement of execution by the target backend, and (iii) validation that the execution results satisfy the predetermined service-level parameters.

2. The computer-implemented method of claim 1 further comprising dynamically adjusting the weights used in computing the composite score through a machine-learning analysis of historical job outcomes.

3. The computer-implemented method of claim 1 wherein the canonical schema comprises metadata fields for cost ceilings, fidelity thresholds, and user priorities.

4. The computer-implemented method of claim 1 further comprising writing a cryptographic hash of a quantum circuit contained in the quantum job description and the execution results to an immutable ledger.

5. The computer-implemented method of claim 1 further comprising updating a provider reputation of the target backend based on a success or failure outcome of the execution results.

6. The computer-implemented method of claim 1 further comprising initiating an automated remediation action in response to the execution results failing to satisfy the predetermined service-level parameters.

7. The computer-implemented method of claim 1 wherein the smart contract releases escrowed funds in milestone tranches that correspond to queue entry, execution start, and successful result verification.

8. The computer-implemented method of claim 1 wherein the user-specified priority comprises at least one of cost minimization, latency minimization, or fidelity maximization.

9. The computer-implemented method of claim 1 further comprising validating a circuit compatibility with hardware constraints of each candidate backend.

10. The computer-implemented method of claim 1 further comprising presenting a user with a forecast of expected queue time and execution cost for each candidate backend.

11. A system for adaptive quantum backend selection, comprising:

one or more processors and non-transitory memory storing instructions that, when executed, cause the processors to:

receive a quantum job description in a canonical schema via a schema interface module;

monitor a plurality of quantum-computing backends through a provider status monitor to obtain real-time metrics including queue length, cost, calibration fidelity, circuit compatibility, and provider reputation;

compute composite scores for the plurality of quantum-computing backends using a scoring engine that applies weighted factors responsive to user priorities;

select, in accordance with the user priorities, a target backend with a highest composite score based on the computed composite score;

translate the received quantum job description into a backend-specific instruction format using a translation engine;

create and manage a blockchain-based escrow smart contract via a blockchain escrow module; and verify execution results of the backend-specific instruction format and update the provider reputation using a verification and reputation manager module, wherein the blockchain escrow module is configured to administer segmented escrow disbursements triggered by sequential on-chain events comprising (i) confirmation of job placement in a target backend queue, (ii) commencement of execution by the target backend, and (iii) validation that execution results satisfy predetermined service-level parameters.

12. The system of claim 11 wherein the provider status monitor polls backend provider application-programming interfaces at configurable time intervals.

13. The system of claim 11 wherein the scoring engine implements a gradient-boosted decision-tree model trained on prior execution data.

14. The system of claim 11 further comprising a user dashboard interface configured to display predicted queue times, costs, and fidelity scores for the plurality of quantum-computing backends.

15. A non-transitory computer-readable medium storing instructions that, when executed by one or more processors, cause the processors to perform one or more operations of a method for adaptive quantum backend selection, the one or more operations comprising:

receiving, by a broker service executing on one or more processors, a quantum job description expressed in a canonical schema;

identifying a plurality of candidate quantum-computing backends;

collecting, for each candidate backend in the plurality of candidate quantum-computing backends, status metrics comprising queue length, cost, hardware fidelity, circuit compatibility, and provider reputation;

computing, for each candidate backend in the plurality of candidate quantum-computing backends, a composite score derived from weighted contributions of the collected status metrics;

selecting, in accordance with a user-specified priority, a target backend having a highest composite score based on the computed composite score;

translating the received quantum job description into a native instruction format of the target backend;

instantiating a smart contract on a blockchain that escrows payment funds contingent upon satisfaction of predetermined service-level parameters;

transmitting the translated native instruction format to the selected target backend for execution;

receiving execution results of the translated native instruction format from the selected target backend; and administering segmented escrow disbursements triggered by sequential on-chain events comprising (i) confirmation of job placement in a target backend queue, (ii)

commencement of execution by the target backend, and (iii) validation that the execution results satisfy the predetermined service-level parameters.

16. The non-transitory computer-readable medium of claim 15, wherein the one or more operations further comprise implementing a reinforcement learning model to update weights applied to the status metrics based on observed discrepancies between predicted and actual execution outcomes.

17. The non-transitory computer-readable medium of claim 15, wherein the one or more operations further comprise maintaining an off-chain distributed data store for measurement outcomes and metadata associated with executed quantum jobs.

18. The non-transitory computer-readable medium of claim 15, wherein the one or more operations further comprise recording audit-trail hashes of each quantum job and corresponding results on the blockchain.

19. The non-transitory computer-readable medium of claim 15, wherein the one or more operations further comprise triggering an automatic partial refund through the smart contract when a measured fidelity of the execution results falls below a user-defined threshold.

* * * * *